(12) United States Patent
Adachi

(10) Patent No.: US 6,766,296 B1
(45) Date of Patent: Jul. 20, 2004

(54) DATA CONVERSION SYSTEM

(75) Inventor: Tetsuji Adachi, Tokyo (JP)

(73) Assignee: NEC Corporation, Tokyo (JP)

(*) Notice: Subject to any disclaimer, the term of this patent is extended or adjusted under 35 U.S.C. 154(b) by 721 days.

(21) Appl. No.: 09/664,060

(22) Filed: Sep. 18, 2000

(30) Foreign Application Priority Data

Sep. 17, 1999  (JP) .......................................... 11/263134

(51) Int. Cl.[7] .............................................. G06F 15/16
(52) U.S. Cl. ........................ 704/246; 709/203; 709/217; 709/219
(58) Field of Search ................................ 709/200–203, 709/205–207, 217–219, 226, 229, 237, 246

(56) References Cited

U.S. PATENT DOCUMENTS

| | | | | |
|---|---|---|---|---|
| 5,303,343 A | * | 4/1994 | Ohya et al. ................... | 709/246 |
| 5,389,924 A | | 2/1995 | Ogawa ........................ | 341/106 |
| 5,694,580 A | * | 12/1997 | Narita et al. ................. | 709/246 |
| 5,699,524 A | * | 12/1997 | Ooishi et al. ................ | 709/246 |
| 5,911,776 A | * | 6/1999 | Guck .......................... | 709/217 |
| 6,141,695 A | * | 10/2000 | Sekiguchi et al. ........... | 709/246 |
| 6,243,681 B1 | * | 6/2001 | Guji et al. ................... | 709/217 |
| 6,334,126 B1 | | 12/2001 | Nagatomo et al. ........... | 709/223 |
| 6,519,630 B1 | * | 2/2003 | Hanawa ...................... | 709/217 |
| 6,601,108 B1 | * | 7/2003 | Marmor ...................... | 709/246 |

FOREIGN PATENT DOCUMENTS

| | | | | |
|---|---|---|---|---|
| CN | 1204434 A | 1/1999 | ........... | H04L/12/24 |
| JP | 9-171490 | 6/1997 | ........... | G06F/13/00 |
| JP | 11-250009 | 9/1999 | ........... | G06F/15/00 |
| JP | 2000-514582 | 10/2000 | ........... | G06F/13/00 |
| WO | 97/15133 | 4/1997 | ........... | H04L/12/24 |
| WO | 98/44424 | 10/1998 | ........... | G06F/13/00 |

OTHER PUBLICATIONS

Borka Jerman–Blažič et al., "Standard Specification Extensions for Provision of Language and Character Enabled Server," Computer Communications, V. 20, 1997, pp. 927–936.

* cited by examiner

Primary Examiner—Bharat Barot
(74) Attorney, Agent, or Firm—Young & Thompson

(57) ABSTRACT

A data conversion system allowing the processing load of character set conversion at a terminal side to be minimized is disclosed. A terminal sends a terminal-supported character code to a gateway 11 when transmitting a data request to the server. In response to the data request received from the terminal, the gateway receives the contents data from the server. When a character code of the contents data is different from the terminal-supported character code, the character code of the contents data is converted to the terminal-supported character code at the gateway and then the contents data of the terminal-supported character code is transmitted to the terminal.

19 Claims, 24 Drawing Sheets

DATA CONVERSION SYSTEM

BACKGROUND OF THE INVENTION

1. Field of the Invention

The present invention relates to a data conversion system, and relates, more particularly, to a data conversion system that is suitable for displaying contents provided by various character sets.

2. Description of Related Art

With the wide use of the Internet that is a collection of computer networks connected to each other throughout the world, it has become possible to easily browse or access to various kinds of contents of WWW (World Wide Web) on the Internet. The WWW is constructed by the contents hierarchically formed in Hyper Text structure on the Internet such that not only text data in reading documents and image data like still images and moving images but also sound data and the like are linked with other data. Such a reading document in the Hyper Text structure is provided as data described in a generalized description language such as HTML (HyperText Markup Language by a WWW server. Users can obtain access to the contents on the WWW servers distributed throughout the world via the Internet, by using browsing software called "browser".

Since the contents are placed on each of WWW servers distributed throughout the world via the Internet, the contents are provided based on one or more character code (or character set) described as an information exchange code corresponding to the language of each country. For example, in Japan, various kinds of contents are generally provided using Roman (English alphabet) characters and Kana (Japanese alphabet) characters conforming to "JIS X0201" that is prescribed by Japan Industrial Standards (hereinafter to be abbreviated as JIS), Kanji (Chinese) characters conforming to "JIS X0208", and other plural character sets such as Unicode (UNICODE), EUC (Extended UNIX Code), and JIS (Shifted-JIS; hereinafter to be abbreviated as S-JIS).

Because of different types of character sets, the contents provided in the EUC character set, for example, cannot be displayed correctly by a browser set with the S-JIS character set mounted on the terminal. This problem is particularly extreme in the case of the contents provided in a multi-byte code system, as compared with the character set of a 7-bit single byte code system.

Consider a network (here, the Internet) connecting a browser-installed terminal and a contents server that is capable of providing the contents to the terminal through the network. The browser-installed terminal can automatically recognize a character set of the contents and can display the contents on its display. In this case, the terminal is equipped with: a character set discriminator that automatically distinguishes between a plurality of character sets such as the Unicode, the EUC or the S-JIS: and a processor that processes the received contents based on a discriminated character set.

It is assumed that the contents are provided in the S-JIS character set. When the terminal has received the contents of the S-JIS from the server via the network, the character set discriminator automatically discriminates the character set, and the processor processes the contents on the discriminated character set so as to display it on the display.

Such a conventional data conversion system, the character set of the contents is automatically recognized on the browser at the terminal side, and the contents are set to the corresponding character set, thereby to correctly display the contents.

In recent years, based on the advancement of the integration technologies and mounting technologies, there have been developed portable information terminals as represented by a PDA (Personal Digital Assistant) equipped with a communication function, and a multifunctional portable telephone terminal. Thus, a provision of Internet services using these terminals has also been in high demand.

However, the processing capacity of these terminals is lower than that of the personal computers, and it is difficult to mount onto the portable information terminals a browser similar to that mounted on a terminal such as a personal computer. For example, in the case of a portable telephone terminal, there arises a problem that the amount of data that can be transferred is limited because of a narrow-band mobile communications network to which the portable telephone terminal is directly connected. In order to overcome this difficulty, there has been proposed a WAP (Wireless Application Protocol) system that makes it possible for the portable telephone terminals to obtain Internet information such as the contents on the WWW servers throughout the world.

In the WAP system, to cope with the narrow band of network and the shortage in the processing capacity of a terminal, the contents on the server are encoded or compiled to produce compressed contents data at the network side. Thereafter, the network provides the compressed contents data to the browsers at the client terminals.

As explained above, it is practically impossible to mount the portable information terminal or portable telephone terminal having a small processing capacity with browsers corresponding to various character sets that operate on a personal computer (PC) having a high processing capacity. Therefore, services of high quality cannot be provided to these portable information terminals and portable telephone terminals. Under this circumstance, only a limited number of character sets can be mounted on these portable information terminals and portable telephone terminals. Accordingly, it has not been possible to obtain a correct display of contents at terminals In the case where the contents are not supported by the mounted character sets.

SUMMARY OF THE INVENTION

It is, therefore, an object of the present invention to provide a data conversion system and method that can minimize the processing load of character set conversion at a terminal side.

According to a first aspect of the present invention, a system includes a server storing predetermined data: a data requesting terminal for requesting the predetermined data from the server; and a network for connecting the server and the data requesting terminal. The data requesting terminal includes; a character code sender for sending a terminal-supported character code to the network when transmitting a data request to the network, wherein the terminal-supported character code is supported in the data requesting terminal. The network includes: a node for receiving the predetermined data from the server in response to the data request received from the data requesting terminal and, when a character code of the predetermined data is different from the terminal-supported character code, converting the character code of the predetermined data to the terminal-supported a character code before transmitting the predetermined data of the terminal-supported character code to the data requesting terminal.

According to a second aspect of the present Invention, the network includes: a character code server for storing a plurality of character code processing modules each corresponding to a plurality of character codes; and a node for receiving the predetermined data from the server in response to a data request received from the data requesting terminal and, when a character code of the predetermined data is different from the terminal-supported character code, receiving a module address of a character code processing module corresponding to the terminal-supported character code from the character code server to send a combination of the predetermined data and the module address to the data requesting terminal. The data requesting terminal includes: a character code sender for sending a terminal-supported character code to the network when transmitting the data request to the network, wherein the terminal-supported character code is supported in the data requesting terminal; a receiver for receiving a character code processing module corresponding to the terminal-supported character code from the character code server based on the module address received from the node; and a converter for converting the character code of the predetermined data to the terminal-supported character code by executing the character code processing module corresponding to the terminal-supported character code.

According to a third aspect of the present invention, the network includes: a character code server for storing a plurality of character code processing modules each corresponding to a plurality of character codes; and a node for receiving the predetermined data from the server in response to a data request received from the data requesting terminal and, when a character code of the predetermined data is different from the terminal-supported character code, receiving a character code processing module corresponding to the terminal-supported character code from the character code server to send a combination of the predetermined data and the character code processing module to the data requesting terminal The data requesting terminal includes: a character code sender for sending a terminal-supported character code to the network when transmitting the data request to the network, wherein the terminal-supported character code is supported in the data requesting terminal: and a converter for converting the character code of the predetermined data to the terminal-supported character code by executing the character code processing module received from the node.

According to a fourth aspect of the present invention, the data requesting terminal includes: a character code sender for sending a terminal-supported character code to the server when transmitting a data request to the server, wherein the terminal-supported character code is supported in the data requesting terminal. The server includes: a storage for storing the predetermined data described in a plurality of character codes; and a data sender for sending the predetermined data of a character code that is the same as the terminal-supported character code to the data requesting terminal.

According to a fifth aspect of the present invention, the data requesting terminal includes: a character code sender for sending a terminal-supported character code to the server when transmitting a data request to the server, wherein the terminal-supported character code is supported in the data requesting terminal. The server includes: a converter for converting a character code of the predetermined data to the to terminal-supported code when the character code of the predetermined data is different from the terminal-supported code; and a data sender for sending the predetermined data of the terminal-supported code to the data requesting terminal.

According to the present invention, a data conversion system implemented in a network, includes;

data request transmitting means for transmitting a data request for obtaining predetermined data, the data request having a supported processing kind of data added thereto;

first distinguishing means for distinguishing the supported processing kind of data based on the data request transmitted by the data request transmitting means;

data storage means storing the predetermined data:

request receiving means for receiving the data request from the data request transmitting means:

data transmitting means for transmitting the predetermined data stored in the data storage means when the data request receiving means has received the data request;

second distinguishing means for distinguishing a processing kind of data from the predetermined data received from the data transmitting means;

decision means for making a decision as to whether the supported processing kind distinguished by the first distinguishing means matches the processing kind distinguished by the second distinguishing means:

converting means for converting the processing kind of the predetermined data Into the supported processing kind distinguished by the first distinguishing means when the decision means has made a decision that the processing kind of the predetermined data does not match the supported processing kind:

data receiving means for receiving data obtained by the converting means; and executing means for executing the data received by the data receiving means.

According to another aspect of the present invention, a data conversion system includes:

data request transmitting means for transmitting a data request for obtaining predetermined data, the data request having a supported processing kind of data added thereto;

first distinguishing means for distinguishing the supported processing kind of data based on the data request transmitted by the data request transmitting means; data storage means storing the predetermined data;

request receiving means for receiving the data request from the data request transmitting means;

data transmitting means for transmitting the predetermined data stored in the data storage means when the data request receiving means has received the data request;

second distinguishing means for distinguishing a processing kind of data from the predetermined data received from the data transmitting means;

processing module storage means storing a plurality of processing modules corresponding to a plurality of processing kinds, respectively;

decision means for making a decision as to whether the supported processing kind distinguished by the first distinguishing means matches the processing kind distinguished by the second distinguishing means;

data receiving means for receiving a processing kind distinguished by the second distinguishing means and data that has been transmitted by the data transmitting means when the decision means has made a decision that the supported processing kind matches the processing kind, and receiving the processing kind distinguished by the second distinguishing means, the data that has been transmitted by the data transmitting means, and specific information for specifying a processing module stored in the processing module storage means corresponding to the processing kind distinguished by the second distinguishing means when the decision means has made a decision that the supported processing kind does not match the processing kind;

processing module obtaining means for obtaining a processing module corresponding to the processing kind from the processing module storage means depending on the specific information when it is not possible to process the received data based on the processing kind received by the data receiving means; and executing means for executing processing of the data received by the data receiving means based on the processing kind received by the data receiving means when it is possible to process the data based on the processing kind received by the data receiving means, and executing processing of the data received by the data receiving means based on the processing module obtained by the processing module obtaining means when it is not possible to process the data received by the data receiving means based on the processing kind received by the data receiving means.

According to still another aspect of the present invention, a data conversion system includes:

data request transmitting means for transmitting a data request for obtaining predetermined data, the data request having a supported processing kind of data added thereto;

data storage means storing data that have been converted into a plurality of different processing kinds, said data of the different processing kinds having same content;

distinguishing means for distinguishing the processing kind based on the data request transmitted by the data request transmitting means;

data transmitting means for transmitting the data stored in the data storage means corresponding to the processing kind distinguished by the distinguishing means;

data receiving means for receiving the data from the data transmitting means; and executing means for processing the data received by the data receiving means.

According to further another aspect of the present invention, a data conversion system includes:

data request transmitting means for transmitting a data request for obtaining predetermined data, the data request having a supported processing kind of data added thereto;

first distinguishing means for distinguishing the supported processing kind of data based on the data request transmitted by the data request transmitting means;

data storage means storing the predetermined data;

request receiving means for receiving the data request from the data request transmitting means;

data transmitting means for transmitting the predetermined data stored in the data storage means when the data request receiving means has received the data request;

second distinguishing means for distinguishing a processing kind of data from the predetermined data received from the data transmitting means;

processing module storage means storing a plurality of processing modules corresponding to a plurality of processing kinds, respectively;

decision means for making a decision as to whether the supported processing kind distinguished by the first distinguishing means matches the processing kind distinguished by the second distinguishing means;

processing module obtaining means for obtaining a processing module stored in the processing module storage means corresponding to the processing kind distinguished by the second distinguishing means when the decision means has made a decision that the supported processing kind does not match the processing kind;

data receiving means for receiving a processing kind distinguished by the second distinguishing means and the data that has been transmitted by the data transmitting means when the decision means has made a decision that the supported processing kind matches the processing kind, and further receiving a processing module that has been obtained by the processing module obtaining means in addition to the processing kind distinguished by the second distinguishing means and the data transmitted by the data transmitting means when the decision means has made a decision that the supported processing kind does not match the processing kind; and executing means for processing the data received by the data receiving means based on the processing kind received by the data receiving means when it is possible to process this data based on the processing kind received by the data receiving means, and processing the data by using the processing module received by the data receiving means when it is not possible to process the data received by the data receiving means based on the processing kind received by the data receiving means.

According to further another aspect of the present invention, a terminal includes: data request transmitting means for transmitting a data request that is expressed by a predetermined character set and a character set as an information exchange code that has been set in advance; data receiving means for receiving data that has been requested by the data request transmitting means; and executing means for AS processing the data received by the data receiving means. A first device includes; data storage means storing the data: request receiving means for receiving the data request from the data request transmitting means; and data transmitting means for transmitting the data stored in the data storage means when the request receiving means has received the data request. A second device includes: first character set distinguishing means for distinguishing a character set based on the data request received from the data request transmitting means; second character set distinguishing means for distinguishing a character set based on content of the data received from the data transmitting means: deciding means for making a decision as to whether the character set distinguished by the first character set distinguishing means matches the character set distinguished by the second character set distinguishing means; character set converting means for converting the data to be transmitted into the character set distinguished by the first character set distinguishing means when the character set distinguished by the first character set distinguishing means does not match the character set distinguished by the second character set distinguishing means; and converted-data transmitting means for transmitting to the data receiving means the data that has been converted by the character set converting means.

According to further another aspect of the present invention, a terminal includes: data request transmitting means for transmitting a data request that is expressed by a predetermined character set, wherein the data request has a character set added thereto, the character set being an information exchange code that has been set in advance; data receiving means for receiving the data requested by the data request transmitting means together with the character set of this data, and further receiving specific information for specifying a processing module corresponding to the data when the character set of the received data is not the character set that has been added to the data request at the time of making the request; processing module obtaining means for obtaining a processing module corresponding to the character set depending on the specific information when the character set of the received data is not the character set that has been added to the data request at the time of making the request: and executing means for processing the received data when the character set of the received data is the character set that has been added to the data request at the time of making the request, and processing the received data by using the processing module obtained by the processing module obtaining means when the character set of the received data is not the character set that has been added to the data-obtain request at the time of making the request. A first device Includes: data storage means storing the data; request receiving means for receiving the data request from the data request transmitting means; and data transmitting means for transmitting the data stored in the data memory means when the request receiving means has received the data request. A second device includes: first character set distinguishing means for distinguishing the character set based on the data request received from the data request transmitting means; second character set distinguishing means for distinguishing the character set of the data received from the data transmitting means; deciding means for making a decision as to whether the character set distinguished by the first character set distinguishing means matches the character set distinguished by the second character set distinguishing means; and data transfer means for transferring to the data receiving means the data transmitted by the data transmitting means together with the character set distinguished by the second character set distinguishing means when the deciding means has made a decision that the character set distinguished by the first character set distinguishing means matches the character set distinguished by the second character set distinguishing means and transferring to the data receiving means the data transmitted by the data transmitting means together with the character set distinguished by the second character set distinguishing means, by further adding to them specific information that specifics a processing module corresponding to the character set distinguished by the second character set distinguishing means when the deciding means has made a decision that the character set distinguished by the first character set distinguishing means does not match the character set distinguished by the second character set distinguishing means. A third device includes: processing module storage means storing a plurality of processing modules for carrying out data processing expressed by each character set corresponding to each of a plurality of character sets; and processing module transmitting means for extracting the processing module corresponding to the character set that has been requested by the processing module obtaining means from the processing module storage means, and transmitting the extracted processing module.

According to further another aspect of the present invention, a terminal includes: data request transmitting means for transmitting a data request that is expressed by d predetermined character set, wherein the data request has a character set added thereto, the character set being an information exchange code that has been set in advance; data receiving means for receiving data that has been requested by the data request transmitting means; and executing means for processing the data received by the data receiving means. A first device includes: data storage means storing data for a plurality of different character sets, said data having the same content as content of the data which is requested by the data request transmitting means: character set distinguishing means for distinguishing the character set based on the data request received from the data request transmitting means; and data transmitting means for extracting the data requested by the data request transmitting means corresponding to the character set distinguished by the character set distinguishing means from the data storage means, and transmitting the extracted data.

According to further another aspect of the present invention, a terminal includes: data request transmitting means for transmitting a data request that is expressed by a predetermined character set, wherein the data request has a character set added thereto, the character set being an information exchange code that has been set in advance; data receiving means for receiving data that has been requested by the data request transmitting means; and executing means for processing the data received by the data receiving means. A first device includes: data storage means storing data: request receiving means for receiving the data request received from the data request transmitting means; data reading means for reading out the data stored in the data storage means when the request receiving means has received the data request; first character set distinguishing means for distinguishing a character set based on the data request received from the data request transmitting means; second character set distinguishing means for distinguishing a character set of the data that has been read by the data reading means; deciding means for making a decision as to whether the character set distinguished by the first character set distinguishing means matches the character set distinguished by the second character set distinguishing means: character set converting means for converting the read-out data into the character set distinguished by the first character set distinguishing means when the deciding means has made a decision that the character set distinguished by the first character set distinguishing means does not match the character set distinguished by the second character set distinguishing means; and converted-data transmitting means for transmitting the data that has been converted by the character set converting means to the terminal.

According to further another aspect of the present invention, a terminal Includes: data request transmitting means for transmitting a data request that is expressed by a predetermined character set, wherein the data request has a character set added thereto, the character set being an information exchange code that has been set in advance; data receiving means for receiving data that has been requested by the data request transmitting means together with the character set of this data, and that further receiving a processing module corresponding to the character set of the data when the character set of the received data is not the character set that has been added to the data request at the time of making the request; and executing means for processing the data received by the data receiving means when the character set of the received data is the character set that has been added to the data request at the time of making the request, and processing the received data by using the processing module received by the data receiving means when the character set of the received data is not the character set that has been added to the data request at the time of making the request. A first device includes: data storage means storing the data; request receiving means for receiving the data request received from the data request transmitting means; and data transmitting means for transmitting the data stored in the data storage means when the request receiving means has received the data request. A second device includes: first character set distinguishing means for distinguishing the character set based on the data request received from the data request transmitting means; second character set distinguishing means for distinguishing the character set of the data received from the data transmitting means; deciding means for making a decision as to whether or not the character set distinguished by the first character set distinguishing means matches the character set distinguished by the second character set distinguishing means; processing module obtaining means for obtaining a processing module corresponding to the character set distinguished by the second character set distinguishing means from a third device when the deciding means has made a decision that the character set distinguished by the first character set distinguishing means does not match the character set distinguished by the second character set distinguishing means: and data transfer means for transferring the data transmitted by the data transmitting means together with the character set distinguished by the second character set distinguishing means to the data receiving means when the deciding means has made a decision that the character set distinguished by the first character set distinguishing means does not match the character set distinguished by the second character set distinguishing means, and transferring the data transmitted by the data transmitting means together with the character set distinguished by the second character set distinguishing means to the data receiving means, by further adding to them the processing module obtained by the processing module obtaining means when the deciding means has made a decision that the character set distinguished by the first character set distinguishing means does not match the character set distinguished by the second character set distinguishing means. A third device includes: processing module storage means storing a plurality of processing modules for carrying out a data processing expressed by each character set corresponding to each of a plurality of character sets; and processing module transmitting means for extracting the processing module corresponding to the character set that has been requested by the processing module obtaining means from the processing module storage means, and transmitting the extracted processing module.

DESCRIPTION OF THE PREFERRED EMBODIMENTS

Preferred embodiments of the present invention will be described in detail with reference to the drawings.

First Embodiment

Figure 1:
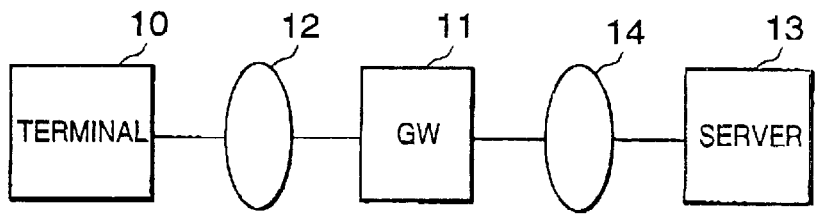
FIG. 1 is a diagram showing a principle structure of a data conversion system according to a first embodiment of the present invention.

As shown in FIG. 1, in a data conversion system according to a first embodiment of the present invention, a terminal 10 is connected with a gateway device (hereinafter to be abbreviated as a GW) 11 via a first network 12. The GW 11 is connected with a server 13 via a second network 14. It is assumed that the terminal 10 can correctly display the contents of a predetermined character set.

First, the terminal 10 transmits to the GW 11 via the first network 12 a request for the contents together with a supported character set. Then, the GW 11 distinguishes the character set that is supported at the terminal 10. The GW 11 receives the contents from the server 13 via the second network 14 in response to the contents request received from the terminal 10. When the character set of the contents received from the server 13 is the same as the character set used at the terminal, the GW 11 transmits the contents as it is to the terminal 10. When the character set of the contents received from the server 13 is different from that supported at the terminal, the GW 11 converts the received character set of the contents into the character set used at the terminal, and transmits the contents of the converted character set to the terminal 10. As a result, the terminal 10 can correctly display the contents regardless of the kind of the character set of the contents stored in the server 13.

Key elements of the data conversion system according to the first embodiment will be explained next.

Terminal

Figure 2:
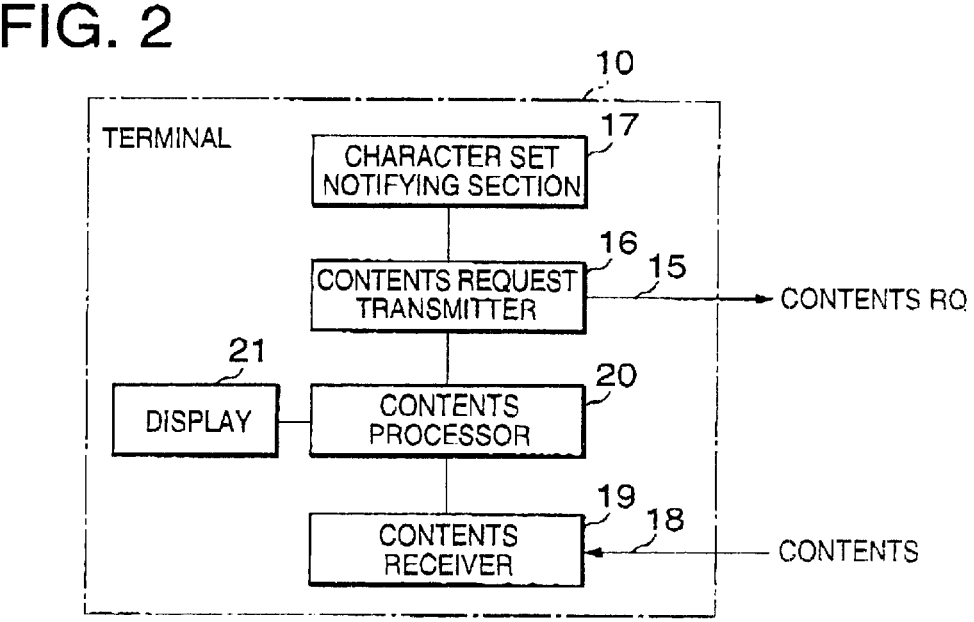
FIG. 2 is a block diagram showing the internal configuration of a terminal according to the first embodiment.

Referring to FIG. 2, the terminal 10 is composed mainly of the following blocks: a contents request transmitter 16 that transmits a contents request 15 to the server 13 via the GW 11; a character set notifying section 17 that adds the supported character set to the contents request 15: a contents receiver 19 that receives contents data 18 as a replay to the contents request 15 from the server 13 via the GW 11; a contents processor 20 that executes the received contents and carries out displaying and other operations: and a display section 21 that displays the contents.

This terminal 10 has, for example, a program-controlled processor such as a central processing unit (hereinafter to be abbreviated as a CPU), and a read-only memory (hereinafter to be abbreviated as a ROM). The terminal 10 carries out the following control by the CPU running a program stored in the ROM thereon.

Figure 3:
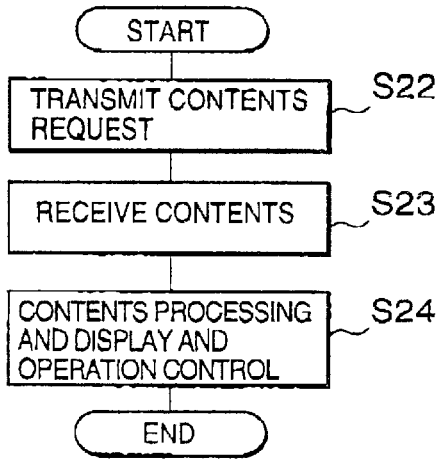
FIG. 3 is a flowchart showing One example of the processing of contents carried out by the terminal according to the first embodiment.

Referring to FIG. 3, the terminal 10 transmits from the contents request transmitter 16 the contents request 15 for requesting the contents that can be correctly displayed (step S22). More specifically, the character set notifying section 17 adds the supported character set to the contents request 15 that is transmitted from the contents request transmitter 16. Then, the contents receiver 19 monitors the reception of the contents from the server 13 as a response to the contents request via the GW 11 and the first network 12 (step S23). When the reception of the contents has been detected, the character set of the received contents has already been the same as the character set supported at the terminal 10. Therefore, the contents processor 20 can directly execute the received contents. In other words, the contents processor 20 carries out various operation controls including displaying the contents on the display section 21, reading out other contents linked to predetermined positions of the contents, or telephone-calling (step S24).

Gateway

Figure 4:
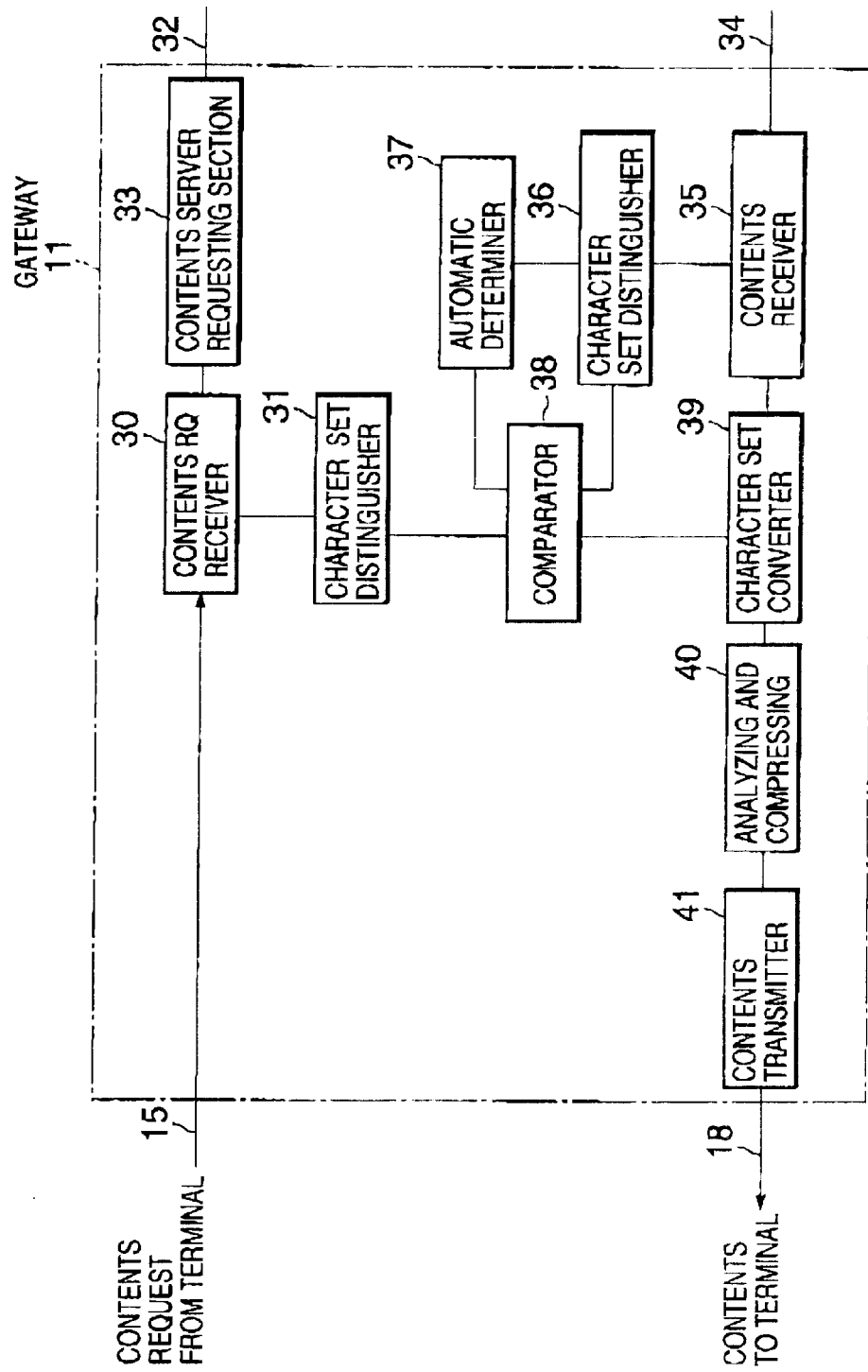
FIG. 4 is a block diagram showing the internal configuration of a gateway according to the first embodiment.

Referring to FIG. 4, the gateway (GW) 11 includes a contents request receiver 30 that receives the contents request 15 from the terminal 10 via the first network 12 and a character set distinguisher 31 that distinguishes the character set that has been set in the terminal 10 and has been added to the contents request received by the contents request receiver 30. A contents server requesting section 33 transmits the contents request to the server 13 as a contents server request 32.

The GW 11 further includes a contents receiver 35 that receives contents data 34 from the server 13 as a response to the contents request 15 that was received from the terminal 10. A character set distinguisher 36 distinguishes a character set of the contents data received by the contents receiver 35, when the character set distinguisher 36 cannot distinguish the character set, an automatic distinguisher 37 detects the character set from the contents. A comparator 38 compares the contents character set that has been distinguished by the character set distinguisher 36 or the automatic distinguisher 37 with the terminal-supported character set of the terminal 10 distinguished by the character set distinguisher 31.

The GW 11 further includes a character set converter 39, which is used to convert the contents character set of the contents data received by the contents receiver 35 into the terminal-supported character set used at the terminal 10 that has been distinguished by the character set distinguisher 31, when the two character sets are different from each other as a result of the comparison by the comparator 38. An analyzing and compressing section 40 analyzes the contents by referring to the character set output from the character set converter 39 and compresses the contents. A contents transmitter 41 transmits the compressed contents to the terminal 10 as contents data 18.

This GW 11 has a CPU and a ROM, for example, and carries out the following control by the CPU running a program stored in the ROM thereon.

Figure 5:
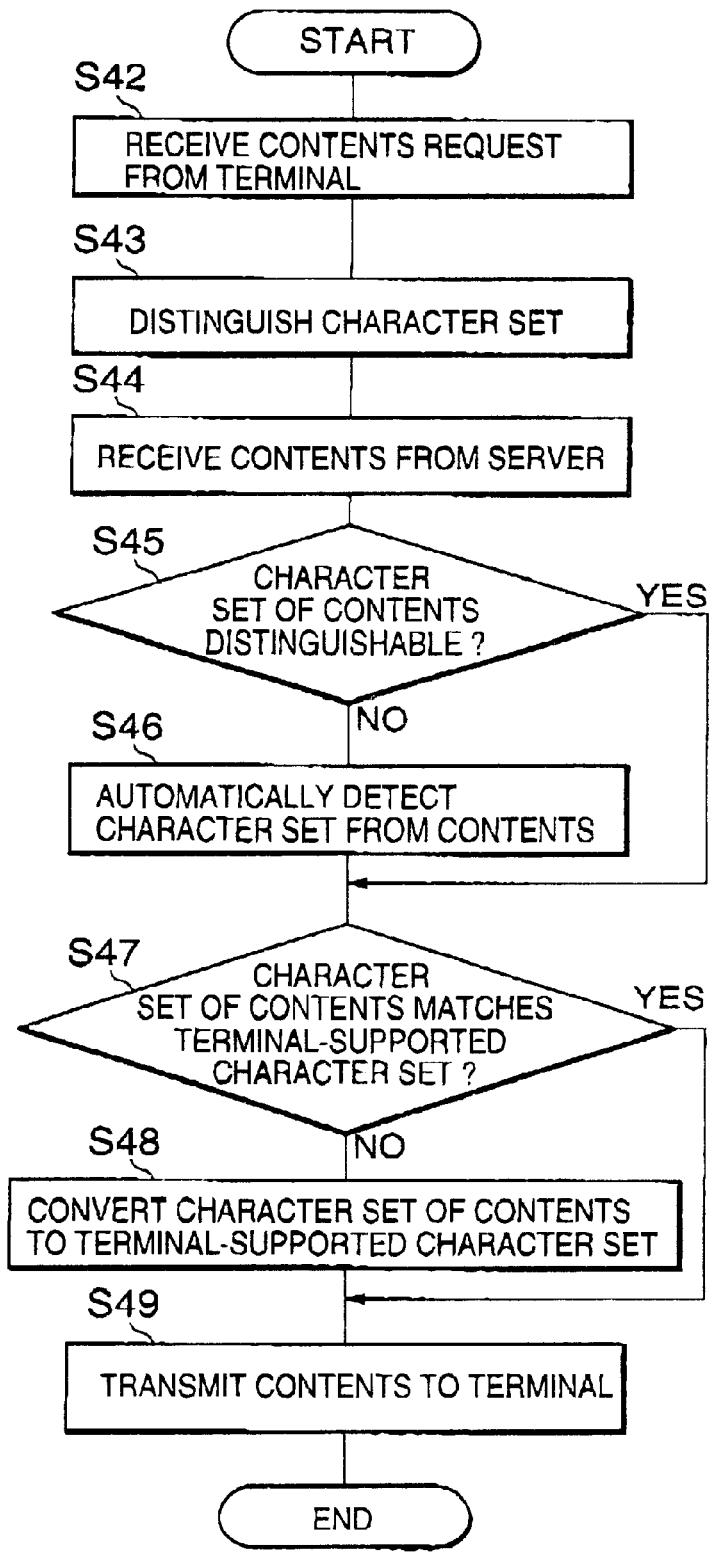
FIG. 5 is a flowchart showing one example of the processing of contents carried out by the gateway according to the first embodiment.

FIG. 5 shows one example of the processing of contents carried out by the gateway according to the first embodiment.

Referring to FIG. 5, the contents request receiver 30 monitors the reception of the contents request 15 from the terminal 10. First, when the contents request receiver 30 has detected the reception of the contents request 15 from the terminal 10 (step S42), the character set distinguisher 31 distinguishes the character set of the terminal 10 that has been added to the contents request 15 (step S43). Then, the contents server requesting section 33 transmits the contents server request 32 to the server 13.

The contents receiver 35 monitors the reception of the contents data 34 from the server 13. When the contents data 34 has been received from the server 13 (step S44), it is determined whether the character set distinguisher 36 distinguishes the character set of the contents received from the server 13 (step S45).

As described later, it is possible to easily distinguish the character set of the contents by referring to the predetermined position of a HTTP header 50 or contents data 51 of a contents data packet 34 (see FIG. 6).

However, in actual practice, it is a current situation that the character set is not necessarily assigned in the HTTP header 50 or the contents data 51 in the contents on the WWW servers throughout the world.

Therefore, when it has not been possible to distinguish the character set of the contents at the step S45 (No in step S45), the automatic distinguisher 37 automatically detects the character set of the contents from the contents (step S46). The automatic distinction is carried out based on the presence or absence of a pattern unique to the character set. As the pattern unique to the character set, there is an escape sequence such as, for example, "0x8e" or "0x8f".

When it has been possible to distinguish the character set of the contents (YES in step S45) or when the character set of the contents has been automatically distinguished at step S46, the comparator 38 makes a decision as to whether or not the character set of the contents distinguished at step S45 or step S46 matches the character set of the terminal 10 that has been distinguished by the character set distinguisher 31 (step S47). When a decision has been made that the two character sets different (No in step S47), the character set converter 39 converts the character set of the contents data received from the server 13 into the character set used at the terminal 10 that has been distinguished by the character set distinguisher 31 (step S48).

When a decision has been made that the character set of the contents received from the server 13 matches the terminal-supported character set (YES in step S47), the analyzing and compressing section 40 analyzes the contents data received by the contents receiver 35 using the character set of the contents, and encodes or compiles the contents data into binary data, thereby compressing the contents data to have a small amount of transfer data. Thereafter, the contents transmitter 41 transmits the compressed contents data to the terminal 10 as the contents data 18 (step S49). When the character set of the contents data from the server 13 has been converted into the character set used at the terminal 10 at step S48, the analyzing and compressing section 40 analyzes the converted contents data by the character set of the converted contents, and encodes or compiles the contents data into binary data, thereby compressing the contents data to have a small amount of transfer data. Thereafter, the contents transmitter 41 transmits the compressed contents data to the terminal 10 as the contents data 18 (step S49).

Figure 6:
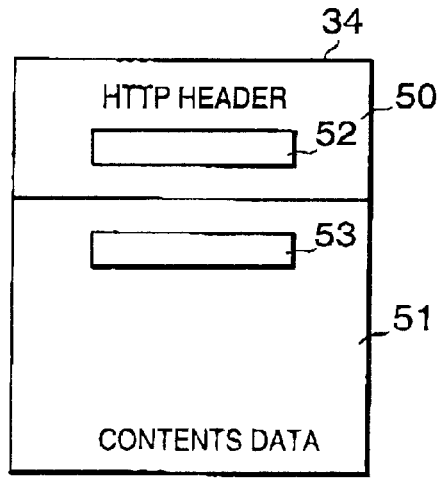
FIG. 6 is an explanatory diagram showing an outline of a structure of a contents data packet according to the first embodiment.

As shown in FIG. 6, contents data packets 34 are transferred from the server 13 according to HyperText Transfer Protocol (hereinafter to be abbreviated as HTTP) that is a protocol at the application level of the second network 14. A contents data packet 34 consists of an HTTP header 50 and contents data 51. The character set of the contents data 51 is usually assigned at a predetermined position of the HTTP header 50 or the contents data 51. Assume, for example, that the contents of the server 13 are described in the extensible markup language (hereinafter to be abbreviated as an XML) that has been paid attention to as the next-generation hypertext markup language using the UNICODE as the character set. In this case, there is a description of "Content-Type: text/XML; charset=UNICODE" at a predetermined position 52 of the HTTP header 50, or there is a description of "<?XML Version="1.0" ecoding="UNICODE"?>" at a predetermined position 53 of the contents main body 51.

Server

Figure 7:
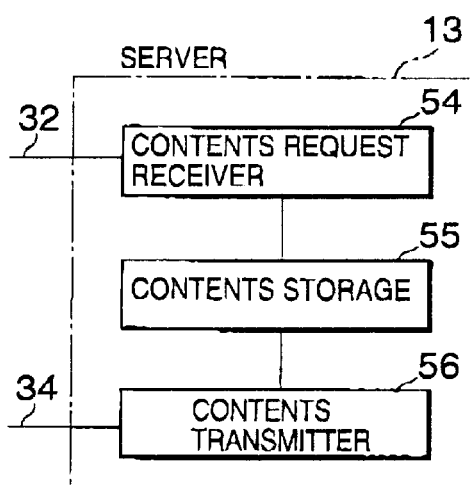
FIG. 7 is a block diagram showing the internal configuration of a server according to the first embodiment.

Referring to FIG. 7, the server 13 is equipped with: a contents request receiver 54 that receives a contents server request 32 that has been transmitted by the GW 11: a contents storage 55 that stores the contents data requested by the terminal 10: and a contents transmitter 56 that transmits to the GW 11 the contents data stored in the contents storage 55 as contents data packets 34 in response to the contents server request, when the contents request receiver 54 has received the contents server request.

The server 13 has a CPU and a ROM, for example, and carries out the following control by the CPU running a program stored in the ROM thereon.

Figure 8:
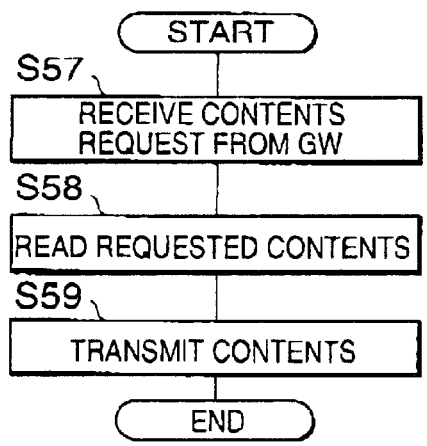
FIG. 8 is a flowchart showing one example of the processing of contents carried out by the server according to the first embodiment.

As shown in FIG. 8, in the server 13, the contents request receiver 54 monitors the reception of the contents request 32 from the GW 11. When the contents request receiver 54 has detected the reception of the contents request 32 (step S57), the contents request receiver 54 reads out the contents data requested by the contents request 32 from the contents storage 55 (step S58). The contents transmitter 56 transmits the contents data to the GW 11 (step S59).

Example

An example of the operation of the data conversion system having the above-described principle structure will be explained in detail below with reference to FIG. 9 and FIG. 10.

Figure 9:
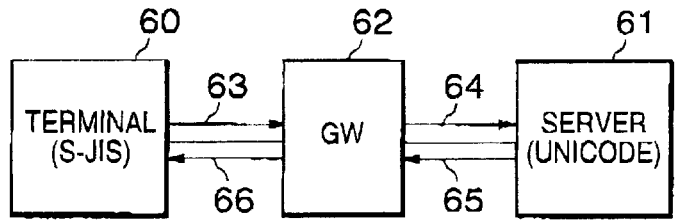
FIG. 9 is a diagram showing one example of the data conversion system according to the first embodiment.

Referring to FIG. 9, the data conversion system has a structure that a terminal 60 is connected to a server 61 via a GW 62, wherein the terminal is supported by the character set of the S-JIS and the server 61 stores the contents of the character set of the UNICODE. The terminal 60 is connected with the GW 62 via a first network (not shown) and the GW 62 is connected with the server 61 via a second network (not shown).

In the data conversion system having the above-described structure, the terminal 60 transmits to the GW 62 a contents request 63 that has a description of "Accept-char=S-JIS" in the HTTP header. In this way, the terminal 60 informs the GW 62 that the terminal-supported character set is the S-JIS, and at the same time, transmits a contents request to the GW 62.

Next, the GW 62 transmits to the server 61 a contents server request 64 that has the same description of "Accept-char=S-JTS" in the HTTP header to request a transfer of the contents from the server 61. When the server 61 has received this contents server request, in many cases, the server 61 simply returns the contents stored in the contents storage regardless of the fact that it has been requested to transmit the contents of which character set is the S-JIS. In this case, the contents of which character set is the UNICODE is simply returned. This is because the prescription on the character set is not strictly kept for the following reasons. First, because of the nature of the WWW, it is impossible to respond to so many various kinds of character sets of the whole world. Second, under the circumstance that the server managers and the contents providers are different and the contents providers prepare the contents in various character sets, it is difficult to implement a strict management of the character set. Therefore, it has been conventional that the character set is automatically distinguished by the browser at the terminal side. Particularly, with the wide use of personal computers, a variety of browsers mounted on these personal computers is also increased. This involves a higher potential that it is not possible to strictly keep the prescriptions on the character set at the server side.

Thus, the GW 62 receives the contents data 65 of which character set is the UNICODE from the server 61 in response to the contents server request 64 transmitted from the GW 62 to the server 61. Since the character set of the contents data stored in the server 61 is the UNICODE, the GW 62 converts the character set of the received contents data 65 into the character set S-JIS used at the terminal 60 that has been informed by the contents request 63. The GW 62 then transmits contents data of this converted character set S-JIS to the terminal 60 as the contents data 66. The terminal 60 executes the received contents data 66, displays the received contents and performs other operation control.

The GW 62 that Carries out the conversion of the character set has a CPU not shown, and can carry out the above-described conversion processing by the CUP running a control program stored in the ROM thereon.

Figure 10:
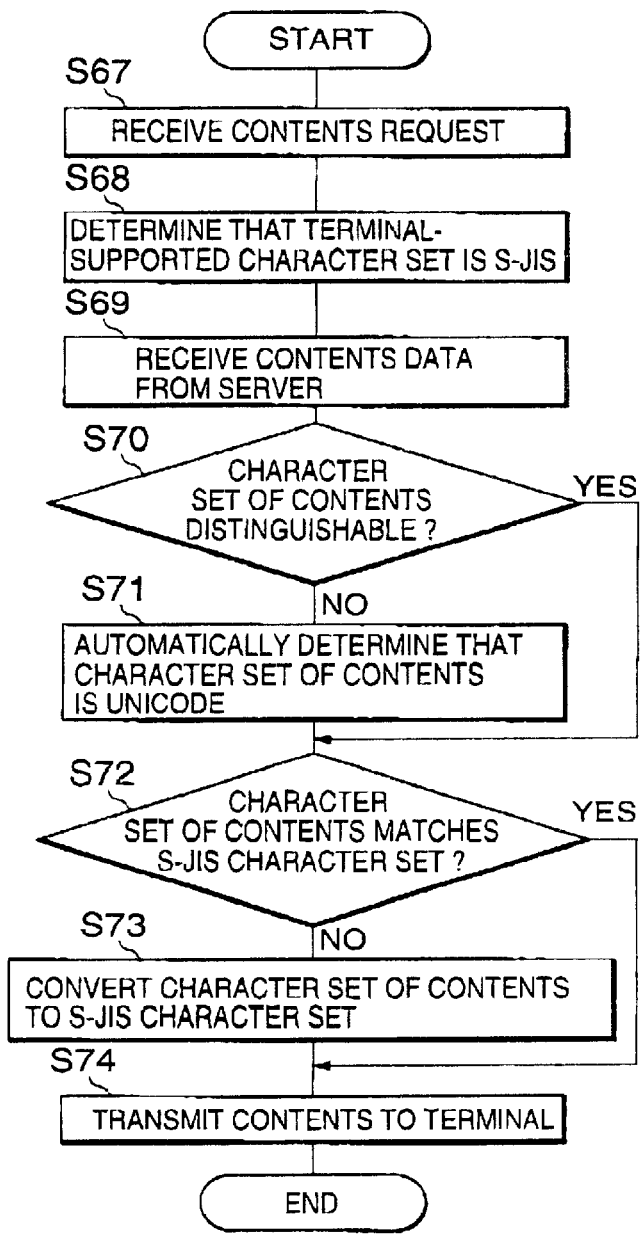
FIG. 10 is a flowchart showing the processing carried out by the gateway according to the first embodiment.

FIG. 10 shows an outline of the processing carried out by the GW 62. The GW 62 receives from the terminal 60 the contents request 63 including a notification that the character set supported by the terminal is the S-JIS (step S67). Then, the character set distinguisher of the GW 62 determines the character set of the terminal 60 as the S-JIS (step S68). The GW 62 uses the received contents request 63 as the contents server request 64 to transmit it to the server 61 so as to request for the transfer of the contents that has been indicated in the contents request. The GW 62 receives the contents data 65 from the server 61, and obtains the requested contents (step S69). The GW 62 then distinguishes the character set of the contents by referring to the protocol header or the contents data of the contents data packet as described before. When the character set has not been distinguished (NO in step S70), the automatic distinguisher automatically detects the character set (here, UNICODE) from the contents (step S71).

The comparator of the GW 62 compares the distinguished character set of the contents received from the server 61 with the S-JIS that is the character set that has been notified from the terminal. As the two character sets are different (NO in stop S72), the GW 62 converts the character set of the contents received from the server 61 into the S-JIS (step S73), and transmits the contents of the converted character set to the terminal 60 (step S74). When the two character sets are identical as a result of the comparison at step S72 (YES in step S72), the GW 62 transmits the received contents as it is to the terminal 60 (step S74).

As described above and shown in FIGS. 1–5, according to the data conversion system of the first embodiment, the terminal 10 transmits to the GW 11 the contents request 15 including the terminal-supported character set. Upon receiving the contents request 15, the GW 11 distinguishes the character set that is added to this contents request 15, and at the same time, transmits this contents request as it is to the server 13 as the contents server request 32. Upon receiving this contents server request 32, the server 13 returns to the GW 11 the contents data that has been stored in advance In response to the received contents request. The GW 11 either distinguishes the character set by referring to the protocol header or the like of a contents data packet received from the server 13 or automatically distinguishes the character set from the contents data. The GW 11 compares the character set of the contents received from the server with the character set that has been notified by the terminal 10. When the two character sets are not Identical to each other, the GW 11 converts the character set of the contents received from the server 13 into the character set notified from the terminal 10, and transmits the contents of the converted character set to the terminal 10. Since the terminal 10 receives the contents of the terminal-supported character set, it is not necessary to distinguish the character set at the terminal side, and the terminal can directly execute and display the received contents. Particularly, even when the first network 12 has a narrow band and when there is a limit to the processing capacity of the terminal 10, it is possible to correctly execute the contents without the need of distinguishing the character set of the contents received from the server 13.

Second Embodiment

Figure 11:
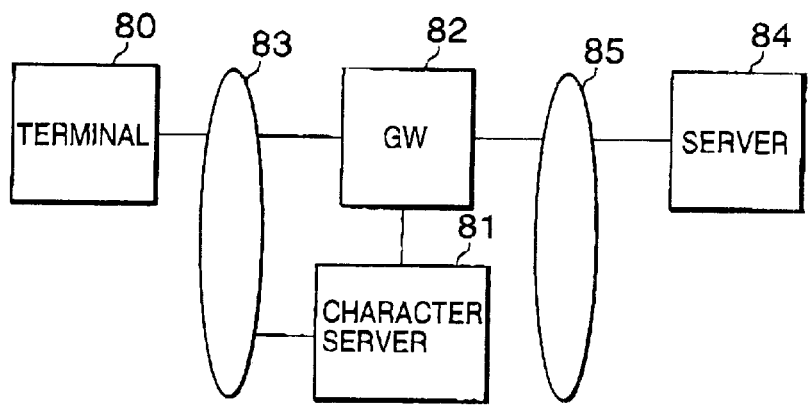
FIG. 11 is a diagram showing a principle structure of a data conversion system according to a second embodiment of the present invention.

Referring to FIG. 11, in a data conversion system according to a second embodiment of the present invention, a terminal 80 is connected with a character server 81 and a GW 82 via a network 83. The character server 81 stores modules that perform processes corresponding to various character sets, respectively. The GW 82 is connected with a server 84 via a network 85. The terminal 80 can display the contents of a predetermined character set.

First, the terminal 80 transmits to the GW 82 via the network 83 a request for the contents together with a terminal-supported character set. Then, the GW 82 distinguishes the character set that is operable at the terminal 80. The GW 82 receives the contents from the server 84 via the network 85 in response to the contents request received from the terminal 80. When the character set of the contents received from the server 84 is the same as the character set used at the terminal, the GW 82 transmits the contents as it is to the terminal 80 by adding the character set information to the contents data.

When the character set of the contents received by the GW 82 from the server 84 is not the same as the character set used at the terminal, the GW 82 further adds to the contents data the address of a module corresponding to the character set of the contents selected from the modules, which carry out the processing of various character sets that are stored in advance in the character server 81 corresponding respectively to various character sets. The GW 82 then transmits the character set accompanied by this module address to the terminal 80.

The terminal 80 refers to the character set Information added to the received contents data. When the character set of the received contents data is identical to the character set of the terminal, the terminal processes the contents data as it is. When the character set of the received contents is different from the character set of the terminal, the terminal 80 extracts the module address that has been received together with the contents data, obtains the module corresponding to this character set from the character server 81. Then, the terminal 80 processes the contents data based on this obtained module. As a result, the terminal 80 can correctly display the contents regardless of the kind of the character set of the contents stored In the server 84.

Key elements of the data conversion system will be explained below. The structure and the operation of the server 84 are the same as those of the server 13 in the first embodiment, and therefore, their explanation will be omitted.

Terminal

Figure 12:
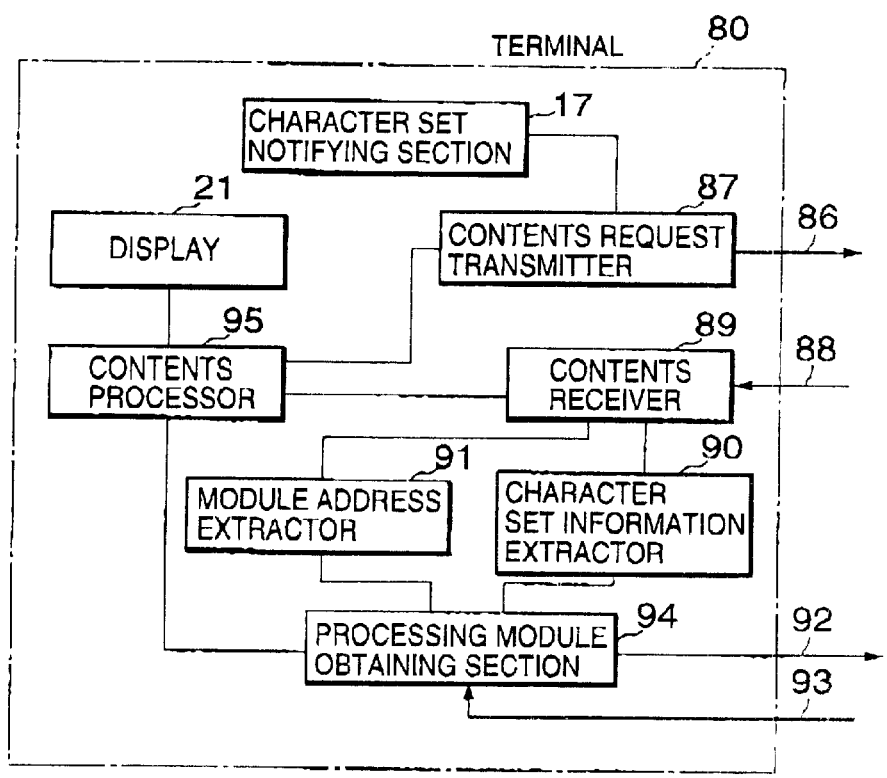
FIG. 12 is a block diagram showing the internal configuration of a terminal according to the second embodiment.

In FIG. 12, blocks corresponding to those of the terminal 10 in the first embodiment shown in FIG. 2 are denoted by the same reference numerals, and their explanation will be suitably omitted.

As shown in FIG. 12, the terminal 80 is equipped with the following sections. A contents request transmitter 87 transmits a contents request 86 to the server 84 via the GW 82. The character set notifying section 17 adds a character set that has been set in the terminal 80 to the contents request 86. A contents receiver 89 receives contents data 88 from the server 84 via the GW 82 as a response to the contents request 86. A character set information extractor 90 extracts character set information showing a character set of the contents that are added to the received contents data 88 A module address extractor 91 extracts the address of a module for processing the character set of the contents added to the contents data in a similar manner.

Further, the terminal 80 is equipped with a processing module obtaining section 94 that obtains a processing module 93 by transmitting to the character server 81 a module request 92 for the obtaining of a processing module specified by the module address based on the extracted character set information. The terminal 80 is further equipped with a contents processor 95 that executes the received contents by building this processing module into the contents processor, and carries out the display and other operation control. The display section 21 displays the contents processed by the contents processor 95.

This terminal 80 has, for example, a CPU and a ROM, and carries out the following control by the CPU running a program stored in the ROM thereon.

Figure 13:
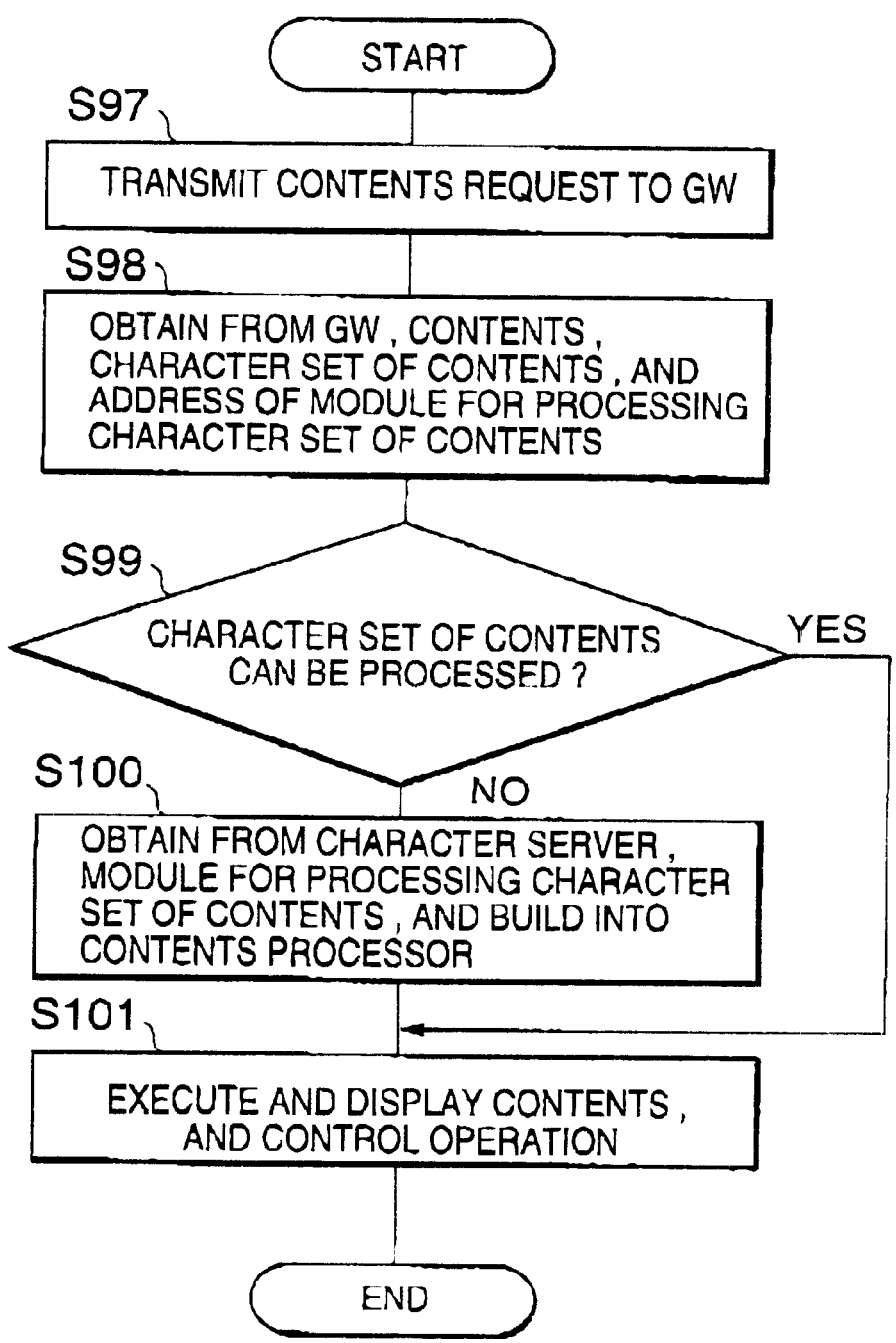
FIG. 13 is a flowchart showing one example of the processing of contents carried out by the terminal according to the second embodiment.

Referring to FIG. 13, in the terminal 80, the contents request transmitter 87 transmits to the GW 82 the contents request 86 so as to request the transfer of the contents that can be displayed in the terminal 80 (step S97). For this purpose, the character set notifying section 17 adds the character set that has been set in advance in the terminal 80 to the contents request 86 to be transmitted from the contents request transmitter 87. Then, the contents receiver 89 receives the contents data 88 from the server 84 via the GW 82 as a reply to the contents request 86 transmitted at step S97.

Then, the character set information extractor 90 extracts the character set information that shows the character set of the contents added to the contents data 88, and also extracts the address of the module for processing the character set (step S98). The processing module obtaining section 94 refers to the character set information, and makes a decision as to whether it is possible to display the contents of the character set shown by the character set information (step S99).

At this point of time, when a processing module corresponding to the character set shown by the extracted character set information has not been built into the contents processor of the terminal 80, it is not possible to display the received contents. Therefore, the processing module obtaining section 94 makes a decision that it is not possible to process the contents, at step S99 (NO in step S99). The processing module obtaining section 94 transmits the module request 92 to the character server 81, and requests for the obtaining of the processing module corresponding to the character set shown by the character set information. When the requested processing module 93 has been obtained from the character server 81, this obtained module is built into the contents processor 95 (step S100). The contents processor 95 executes the contents received by the contents receiver 89 so that the received contents are displayed on the display section 21 and other operation control is performed (step S101).

On the other hand, at step S99, when the received character set is the same as the character set of the terminal or the same as the character set that has been received previously, and also when the processing module corresponding to this character set has already been mounted into the terminal, it is possible to correctly display the contents of the character set shown by the extracted character set information. Therefore, a decision is made that it is possible to process the contents received by the contents receiver 89 (YES in step S99). Thus, the contents processor 95 executes the contents received by the contents receiver 89 and the result is displayed on the display section 21 and other operation control is performed (step S101).

Gateway

Figure 14:
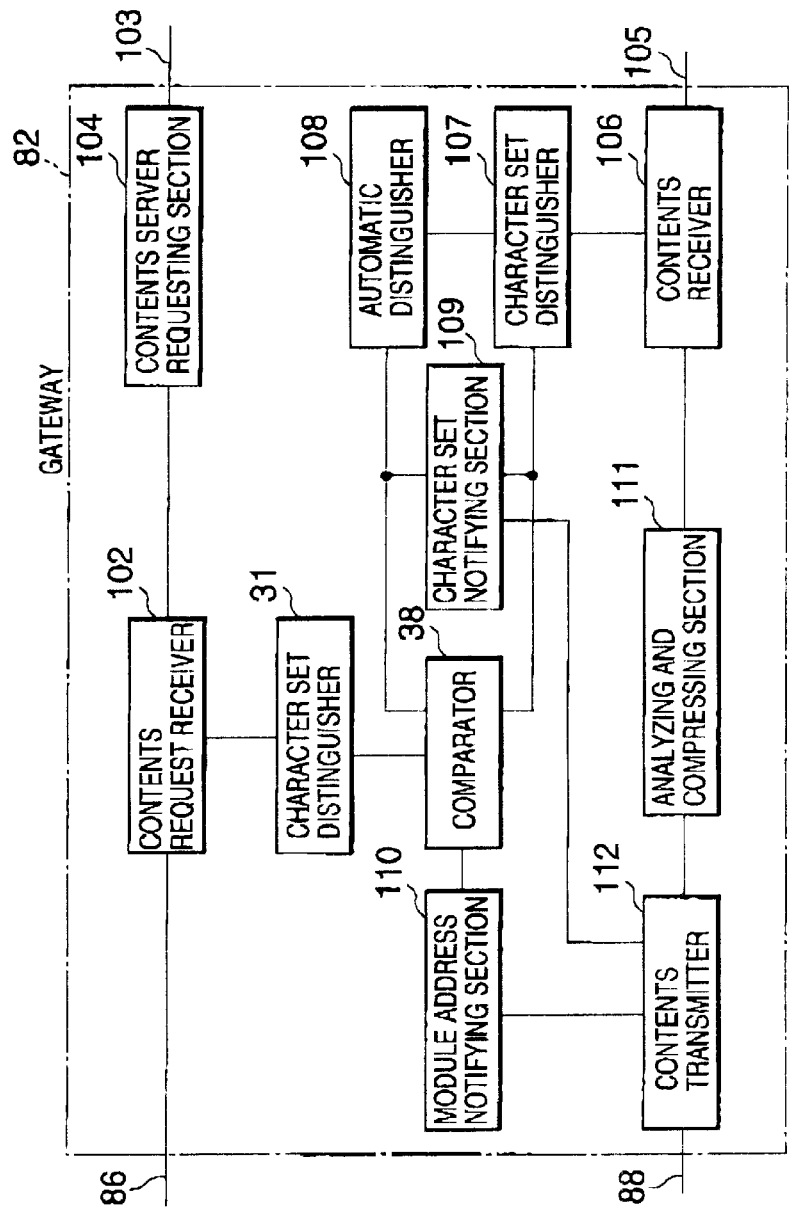
FIG. 14 is a block diagram showing the internal configuration of a gateway according to the second embodiment.

Referring to FIG. 14, blocks that are the same as those of the GW 11 in the first embodiment shown in FIG. 4 are denoted by the same reference numerals, and their explanation will be suitably omitted.

The GW 82 is equipped with: a contents request receiver 102 that receives the contents request 86 from the terminal 80; a character set distinguisher 31 that distinguishes the character set that has been set in the terminal 80 and that has been added to the contents request received by the contents request receiver 102; and a contents server requesting section 104 that transmits the contents request to the server 84 as a contents server request 103.

The GW 82 is further equipped with: a contents receiver 106 that receives contents data 105 from the server 84 as a response to the contents request 86 from the terminal 80; a character set distinguisher 107 that distinguishes the character set of the contents data received by the contents receiver 106; and an automatic distinguisher 108. The automatic distinguisher 108 distinguishes the character set from the contents, in a similar manner to that of the automatic distinguisher 37 in the first embodiment, when the character set distinguisher 107 cannot distinguish the character set.

The GW 82 is further equipped with: a comparator 38 that compares the character set that has been distinguished by the character set distinguisher 107 or the automatic distinguisher 108 with the character set of the terminal 80 distinguished by the character set distinguisher 31; a character set notifying section 109 that adds the character set that has been distinguished by the character set distinguisher 107 or the automatic distinguisher 108 to the contents data as character set information; and a module address notifying section 110 that notifies the address of a processing module stored in the character server 81 corresponding to the character set that has been distinguished by the character set distinguisher 107 or the automatic distinguisher 108, when the two character sets are different from each other as a result of the comparison by the comparator 38.

The GW 82 is further equipped with; an analyzing and compressing section 111 that analyzes the contents by referring to the character set of the contents received by the contents receiver 106 and compresses the contents; and a contents transmitter 112 that transmits the contents data 88 to the terminal 80, the contents data 88 being obtained by adding the character set information notified by the character set notifying section 109 and the module address notified by the module address notifying section 110 to the compressed contents.

This GW 82 has a CPU and a ROM, for example, and carries out the following control based on a program stored in this ROM.

Figure 15:
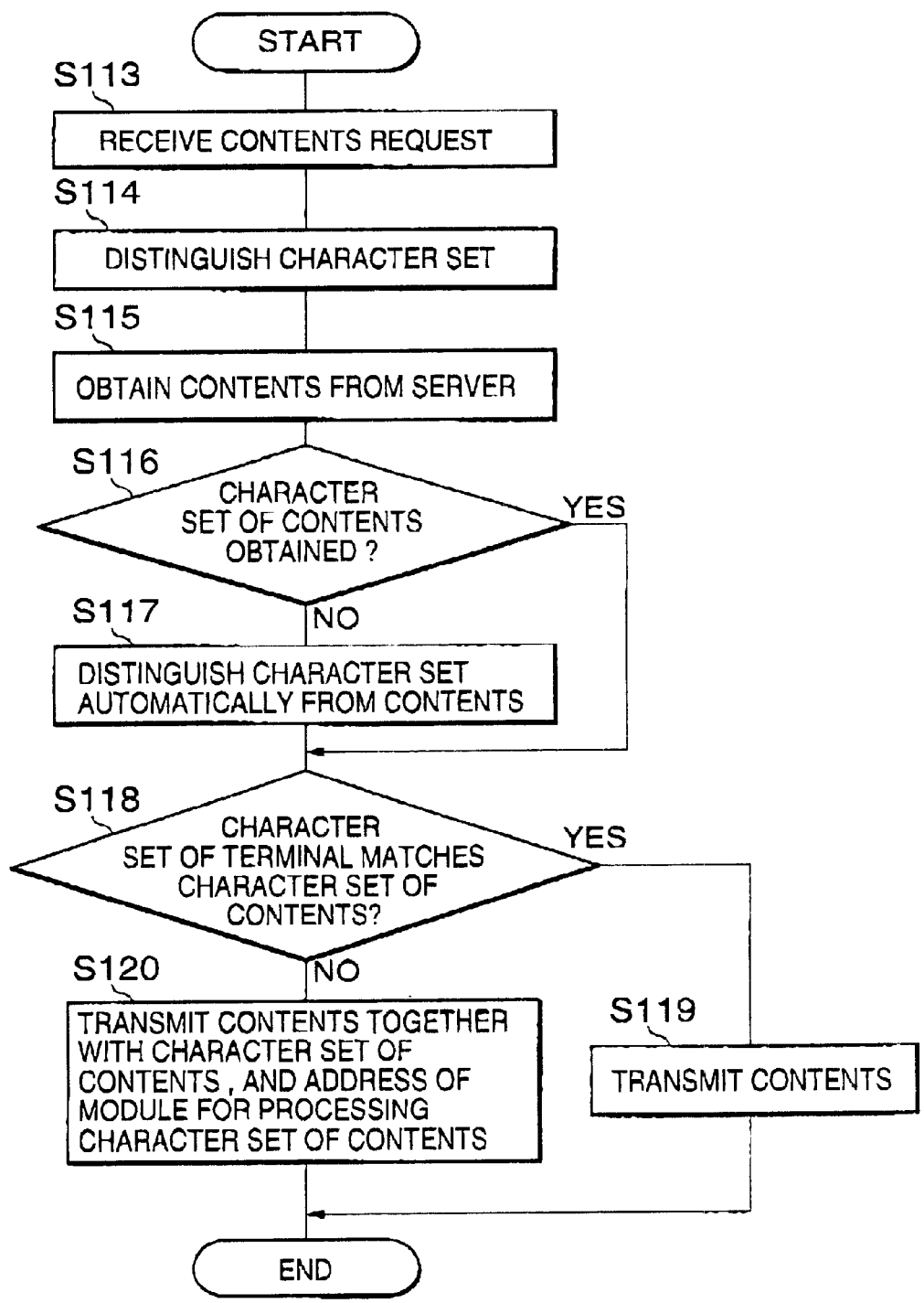
FIG. 15 is a flowchart showing one example of the processing of contents carried out by the gateway according to the second embodiment.

Referring to FIG. 15, the contents request receiver 102 monitors the reception of the contents request 86 from the terminal 80. First, when the contents request receiver 102 has detected the reception of the contents request 86 from the terminal 80 (step S113), the character set distinguisher 31 distinguishes the character set of the terminal 80 that has been added to the contents request 86 (step S114). Then, the contents server requesting section 104 transmits the contents server request 103 to the server 84, and the contents request receiver 102 monitors that the contents receiver 106 receives the transmission contents data 105 from the server 84. When the transmission contents data 105 has been received from the server 84 (step S115), the character set distinguisher 107 distinguishes the character set of the contents (step S116) At step S116, the character set distinguisher 107 distinguishes the character set of the contents in a similar manner to that of the character set distinguisher 36 of the GW 11 in the first embodiment.

When it has not been possible to distinguish the character set of the contents (NO in step S116), the automatic distinguisher 108 automatically distinguishes the character set of the contents from the contents (step S117). The automatic distinction at step S116 is carried out in a similar manner to that of the automatic distinguisher 37 of the GW 11 in the first embodiment.

When it has been possible to distinguish the character set of the contents (YES in step S116) or when the character set of the contents has been automatically distinguished at step S117, the comparator 38 makes a decision as to whether or not the character set of the contents distinguished at step S116 or step S117 matches the character set of the terminal 80 distinguished by the character set distinguisher 31 (step S118). When a decision has been made that the two character sets match (YES in step S118), the analyzing and compressing section 111 analyzes the contents data received by the contents receiver 106 using the character set of the contents, and encodes or compiles the contents data Into binary data, thereby compressing the contents data. Then, the character set notifying section 109 adds the character set information that shows the character set distinguished by the character set distinguisher 107 or by the automatic distinguisher 108, to the compressed contents data. Thereafter, the contents transmitter 112 transmits the compressed contents data with the character set information as the contents data 88 to the terminal 80 (step S119).

On the other hand, when the comparator 38 has made a decision that the two character sets are different (NO in step S118), the analyzing and compressing section 111 analyzes the contents data received by the contents receiver 106 using the character set of the contents, and encodes or compiles the contents data into binary data, thereby compressing the contents data. Then, the character set notifying section 109 adds the character set information that shows the character set distinguished by the character set distinguisher 107 or by the automatic distinguisher 108, and the address of the module stored in the character server 81 that processes the character set of the contents received from the module address notifying section 110, to the compressed contents data. Thereafter, the contents transmitter 112 transmits the compressed contents data with the character set information and the module address to the terminal 80 as the contents data 88 (step S120).

Character Server

Figure 16:
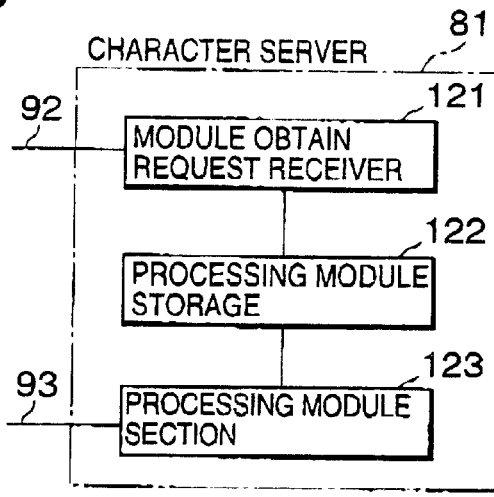
FIG. 16 is a block diagram showing the internal configuration of a character server according to the second embodiment.

Referring to FIG. 16, the character server 81 includes: a module obtain-request receiver 121 that receives a module request 92 from the terminal 80; a processing module storage 122 that stores a plurality of processing modules for processing character sets corresponding to the respective character sets; and a processing module transfer section 123 that transfers a processing module 93 of the character set corresponding to the module request 92. In the processing module storage 122, a module for processing a specific character set can be designated by an address like URL (Uniform Resource Locator).

This character server 81 has a CPU and a ROM, for example, and carries out the following control based on a program stored in this ROM.

Figure 17:
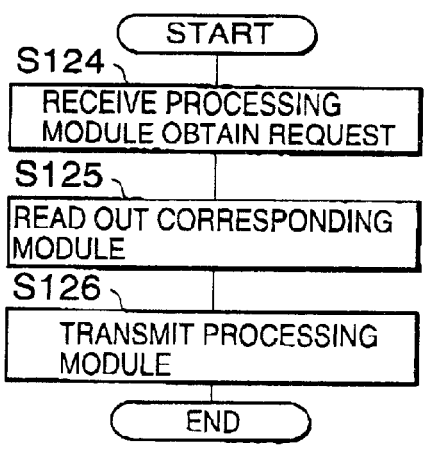
FIG. 17 is a flowchart showing one example of the processing of contents carried out by the character server according to the second embodiment.

Referring to FIG. 17, in the character server 81, the module obtain-request receiver 121 monitors the reception of a module request 92 from the terminal 80. When the module obtain-request receiver 121 has detected the reception (step S124), the module obtain-request receiver 121 extracts the address of the processing module that is included in the received module request 92. This address is the one that has been assigned as the address of a module for processing the character set of the contents received by the terminal 80. The respective processing modules carry out the processes corresponding to the character sets stored in advance in the processing module storage 122. Then, the processing module transfer section 123 reads out the processing module of the character set corresponding to this address from the processing module storage 122 (step S125), and transmits this processing module to the terminal 80 as the processing module 93 (step S126).

Example

An example of an operation of the data conversion system having the above-described structure will be explained in detail hereafter with reference to FIG. 18 and FIG. 20.

Figure 18:
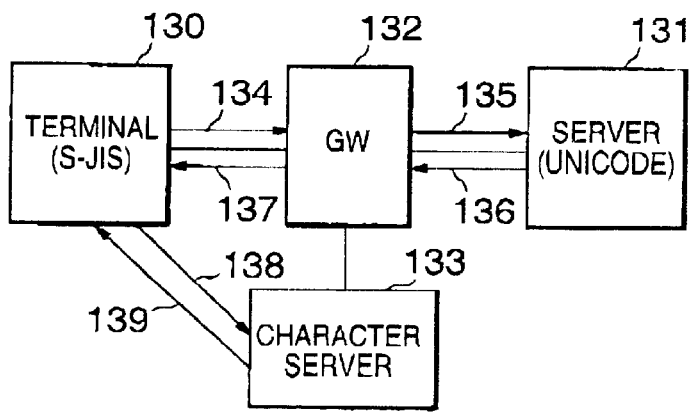
FIG. 18 is a diagram showing one example of the data conversion system according to the second embodiment.

As shown In FIG. 18, the data conversion system has a structure that a terminal 130 that can correctly display the contents of the character set of the S-JIS is connected with a server 131 that stores the contents of the character set of the UNICODE via a GW 132. The GW 132 is connected with a character server 133 that stores processing modules for processing character sets corresponding to the character sets of the S-JIS, the UNICODE and the like. The terminal 130, the GW 132 and the character server 133 are connected to each other via a network (not shown). The GW 132 is connected with the server 131 via a network (not shown).

In the data conversion system having the above-described structure, the terminal 130 transmits to the GW 132 a contents request 134 that has a description of "Accept-char=S-JIS" in the HTTP header. In this way, the terminal 130 informs the GW 132 that the character set supported in the terminal 130 is the S-JIS, and at the same time, requests the transfer of the contents from the GW 132.

Next, the GW 132 transmits a contents server request 135 requesting for a transfer of the contents that has the same description of "Accept-char=S-JIS" in the HTTP header, to the server 131. According to the background as described previously, the server 131 usually disregards the assignment of the character set, and simply sends the contents as it is back to the GW 132.

The GW 132 receives the contents data 136 from the server 131. The GW 132 distinguishes the character set of the contents stored in the server 131 as the UNICODE, and adds this character set as the character information to the contents data. Since the character set UNICODE of the contents data is different from the character set S-JIS of the terminal, the GW 132 also adds to the contents data the module address that specifies a storage location in the character server 133 of the processing module for processing the UNICODE that is the distinguished character set of the contents. The contents data 137 produced in such a way is sent to the terminal 130.

When having received the contents data 137, the terminal 130 extracts the character set information, and distinguishes the received character set of the contents as the UNICODE. At this point of time. Since the character set that can be processed at the terminal 130 Is the S-JIS, the terminal 130 makes a decision that it is impossible to process the received contents. Thus, the terminal 130 transmits a module request 138 to the character server 133 by using the address of the UNICODE processing module that is added to the contents data 137. When the character server 133 has received the module request 138, the character server 133 takes out the UNICODE processing module by this module request 138, and sends the UNICODE processing module to the terminal 130 as the processing module 139. Upon receiving this processing module 139, the terminal 130 builds this processing module into the contents processor of the terminal, and executes the contents of the UNICODE, and carries out displaying and other operation control.

The terminal 130 and the GW 132 that make it possible to display the contents by obtaining the processing module have a CPU (not shown), respectively, and can carry out the above-described processing according to a control program stored in the ROM.

Figure 19:
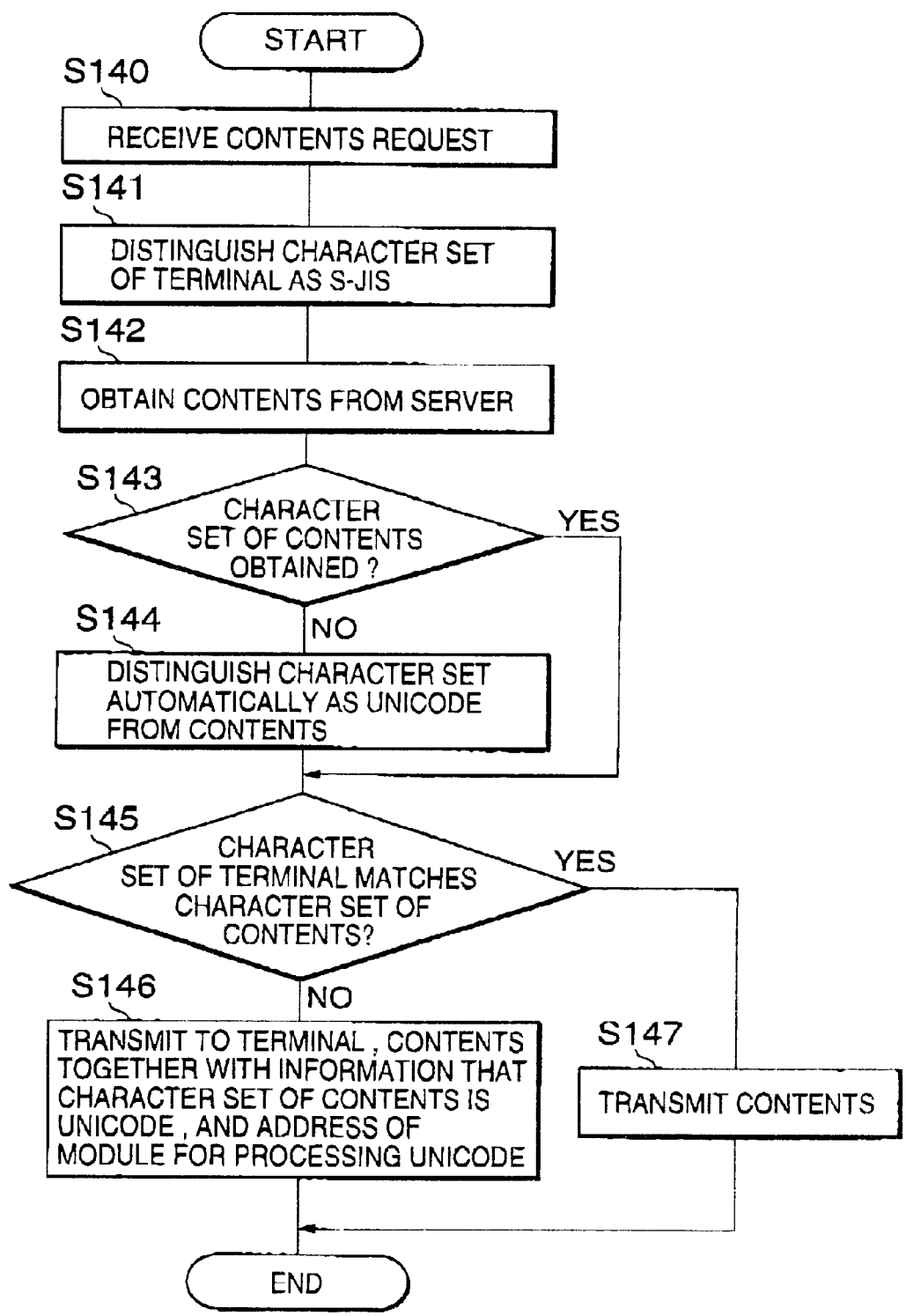
FIG. 19 is a flowchart showing the processing of contents carried out by the gateway in the example of the data conversion system according to the second embodiment.

Referring to FIG. 19, first, the GW 132 receives from the terminal 130 the contents request 134 that is accompanied by a notification that the terminal-supported character set is the S-JIS (step S140). Then, the character set distinguisher of the GW 130 distinguishes the character set of the terminal 80 as the S-JIS (step S141). The GW 132 requests the server 61 for the return of the contents that has been indicated in the received contents request 131, by using this contents request 131 as the contents server request 135. The GW 132 receives the contents data 136 from the server 131, and obtains the requested contents (step S142). The GW 132 then distinguishes the character set of the received contents by referring to the protocol header or the contents data of the contents data packet. When the character set has not been distinguished (NO in step S143), the automatic distinguisher automatically distinguishes the character set from the contents (step S144).

The character set of the UNICODE that has been distinguished from the protocol header or the contents data of the contents data packet (YES In step S143) or distinguished from the contents (step S144) is added to the contents data 137 as the character set information. The UNICODE as the character set of the contents is compared to the S-JIS that is the character set that has been notified from the terminal as an addition to the contents request. When the two character sets are different (NO in step S145), the module address that specifies the storage location of the processing module for processing the UNICODE is also added to the contents data from among a plurality of processing modules stored in the character server 133, and the contents data 137 with the additions is transmitted to the terminal 130 (step S146). When the two character sets match (YES in step S145), this module address is not added to the contents data because it is possible to process the contents data at the terminal without this module address (step S147).

Figure 20:
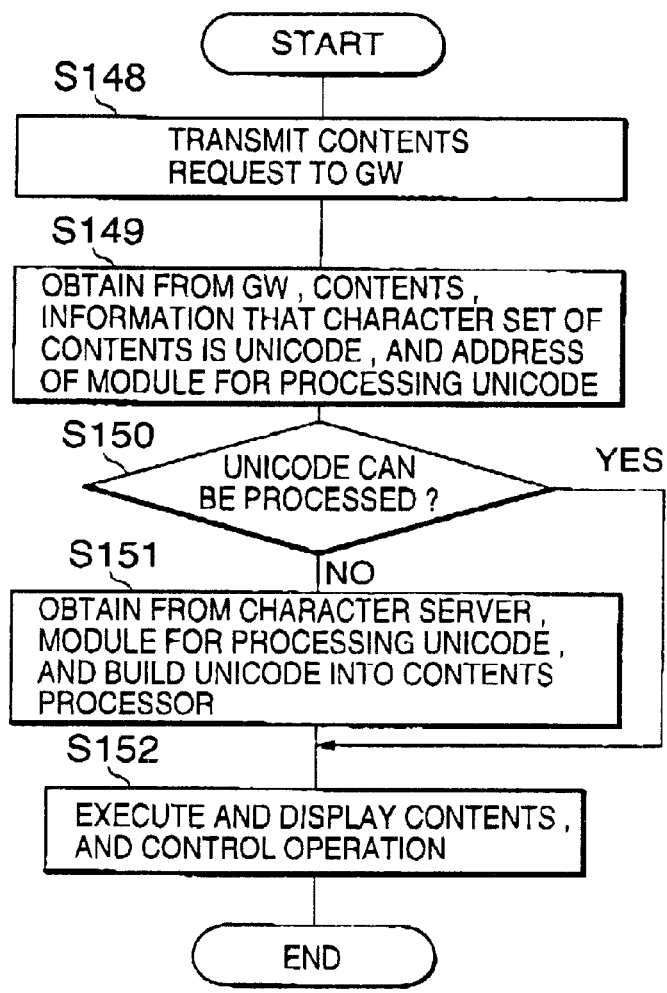
FIG. 20 is a flowchart showing the processing of contents carried out by the terminal in the example of the data conversion system according to the second embodiment.

Referring to FIG. 20, the terminal 130 transmits to the server 131 via the GW 132 the contents request 134 that requests for the transfer of the contents, the contents request 134 for having the notification that the terminal-supported character set is the S-JIS (step S148). Then, the terminal 130 receives from the server 131 via the GW 132 the contents data 137 in response to the contents request 134 that has been transmitted at step S148. The terminal 130 extracts the character set information and the module address added to this contents data 137, and distinguishes the character set of the received contents data as the UNICODE. At the same time, the terminal 130 obtains the address of the UNICODE processing module stored in the character server 133 (step S149).

Next, the terminal 130 refers to the character set information, and makes a decision as to whether it is possible to process the received contents or not (step S150). At this point of time, since the terminal 130 can execute the contents by the character set of the S-JIS, it is not possible to process the received contents of the UNICODE character set. Therefore, the terminal 130 decides that it is not possible to process the contents (NO in step S150). Thus, the terminal 130 transmits to the character server 133 the module request 138 that requests the character server 133 to transfer the UNICODE processing module to the terminal 130. When the terminal 130 has received the UNICODE processing module 139 from the character server 133 as a response to this request, the terminal 130 builds the received module Into the contents processor (step S151). The contents processor then executes the received contents of the UNICODE character set, and carries out displaying and other operation control (step S152). In the case where the UNICODE processing module has already been built into the terminal 130, the terminal 130 makes a decision that it is possible to process the received contents (YES in step S150). Then, the terminal 130 executes the received contents of the UNICODE character set, and carries out the displaying and other operation control (step S152).

As explained above, according to the data conversion system of the second embodiment, the terminal 80 transmits to the GW 82 the contents request 86 including the terminal-supported character set of the contents.

Upon receiving the contents request 86, the GW 82 distinguishes the character set that Is added to this contents request 86, and at the same time, transmits this contents request directly to the server 84 as the contents server request 103.

Upon receiving this contents server request 103, the server 84 send back to the GW 82 the contents that have been stored in advance corresponding to this request. The GW 82 either distinguishes the character set by referring to the protocol header or the like of the contents from the server 84 or automatically distinguishes the character set from the contents. Thus, the character set information that shows the character set distinguished from the contents, and the module address that specifies the storage location of the processing module for processing the character set of the terminal stored in the character server 81 are also transmitted to the terminal 80 together with the contents data 88 from the server 84, when the character set of the contents and the character set of the terminal are different.

When the terminal 80 cannot process the character set of the received contents, the terminal 80 makes a request to the character server 81 for a transfer of the processing module based on the module address. Thus, the terminal 80 obtains the module capable of processing the character set of the received contents, and builds this module into the contents processor. Based on this arrangement, it is possible to correctly display the contents at the terminal 80 without the need for distinguishing the character set at the terminal side, regardless of the kind of the character set of the contents stored in the server 84. Further, since it is not necessary to convert the character set of the contents, it becomes possible to substantially reduce the processing load of the GW 82.

Third Embodiment

Figure 21:
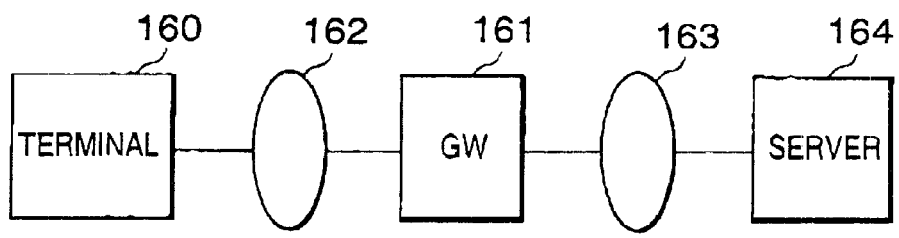
FIG. 21 is a diagram showing one example of a data conversion system according to a third embodiment of the present invention.

Referring to FIG. 21, in a data conversion system according to a third embodiment of the present invention, a terminal 160 is connected with a GW 161 via a network 162. The GW 161 is connected with a server 164 via a network 163. The terminal 160 can correctly display the contents of a predetermined character set.

First, the terminal 160 transmits to the server 164 via the GW 161 a request for the contents and an terminal-supported character set. Then, the GW 161 distinguishes the character set that can be correctly displayed at the terminal 160, and transmits to the server 164 a contents request as well as the distinguished character set. The Server 164 stores in advance the same contents for various kinds of character sets. The server 164 then returns to the GW 161 the contents of the character set determined by the contents request received from the GW 161. The GW 161 receives the contents from the server 164, and transmits the received contents to the terminal 160. Thus, the terminal 160 can obtain the contents of the character set that has been set in the own terminal in advance. Therefore, it is possible to correctly display the contents at the terminal 160.

Key elements of the data conversion system will be explained below. The structure and the operation of the terminal 160 are the same as those of the terminal in the first embodiment, and therefore, their explanation will be omitted.

Gateway

Figure 22:
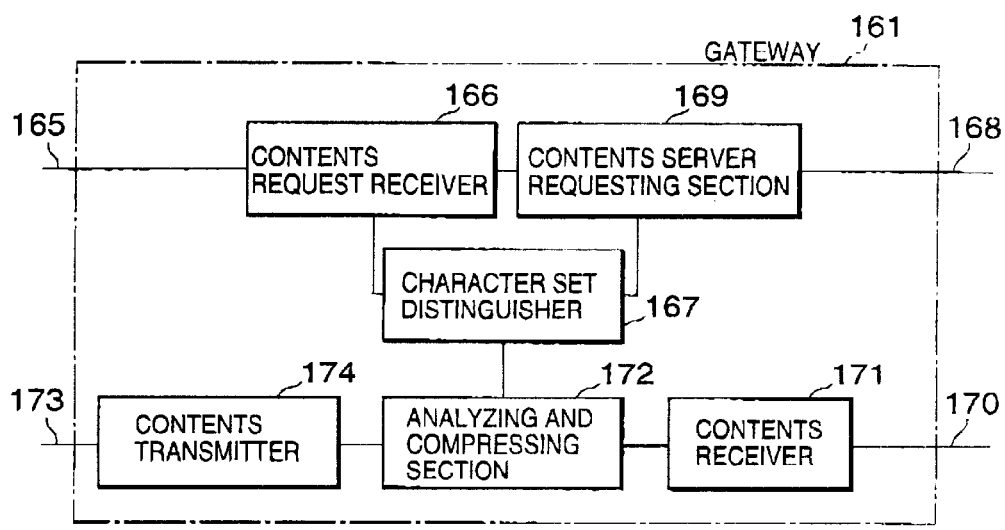
FIG. 22 is a block diagram showing the internal configuration of a gateway according to the third embodiment.

Referring to FIG. 22, the GW 161 is equipped with: a contents request receiver 166 that receives a contents request 165 from the terminal 160; a character set distinguisher 167 that distinguishes the character set that has been set in the terminal 160 and has been added to the contents request received by the contents request receiver 166; and a contents server requesting section 169 that transmits the contents request to to the server 164 as a contents server request 168 together with character set notifying information that has been distinguished by the character set distinguisher 167.

The GW 161 is further equipped with: a contents receiver 171 that receives contents data 170 from the server 164 as a 15 response to the contents request 165 received from the terminal 160; an analyzing and compressing section 172 that analyzes and compresses the contents data that has been received by the contents receiver 171 using the character set distinguished by the character set distinguisher 167; and a contents transmitter 174 that transmits the compressed data to the terminal 160 as contents data 173.

This GW 161 has a CPU and a ROM, for example, and carries out the following control based on a program stored in this ROM.

Figure 23:
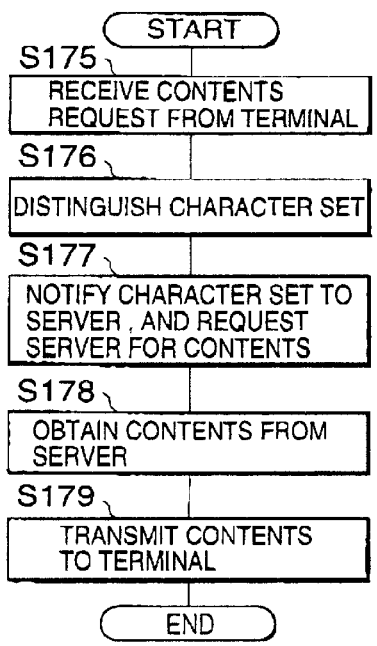
FIG. 23 is a flowchart showing one example of the processing of contents carried out by the gateway according to the third embodiment.

Referring to FIG. 23, the contents request receiver 166 monitors the reception of the contents request 165 from the terminal 160. When the contents request receiver 166 has detected the reception (step S175), the character set distinguisher 167 distinguishes the character set that can be correctly displayed at the terminal 160 and is included in the contents request (step S176). Then, the contents server requesting section 169 transmits to the server 164 the contents server request 168 added with the character set that has been distinguished at step S176 (step S177).

Thereafter, the contents receiver 171 monitors the reception of the contents data 170 from the server 164 as a response to the contents server request 168. When the contents data 170 has been received from the server 164 (step S178), the analyzing and compressing section 172 analyzes the contents data by the character set that has been distinguished by the character set distinguisher 167. The analyzing and compressing section 172 encodes or compiles the contents data into binary data, thereby compressing the contents data. Thereafter, the contents transmitter 174 transmits the compressed contents data to the terminal 160 as the contents data 173 (step S179).

Server

Figure 24:
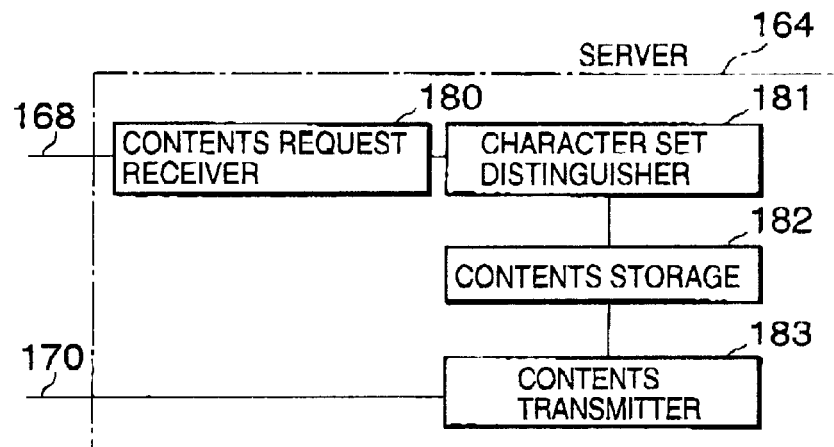
FIG. 24 is a block diagram showing the internal configuration of a server according to the third embodiment.

Referring to FIG. 24, the server 164 Is equipped with; a contents request receiver 180 that receives a contents server request 168 that has been transmitted by the GW 161; a character set distinguisher 181 that distinguishes the character set that has been designated by the terminal 160 and has been added to the contents server request; a contents storage 182 that stores the contents data of the same content for a plurality of character sets; and a contents transmitter 183 that transmits to the GW 161 the contents data of the corresponding character set stored in the contents storage 182 as transmission contents data 170, when the contents request receiver 180 has received the contents server request.

This server 164 has a CPU and a ROM, for example, and carries out the following control based on a program stored In this ROM.

Figure 25:
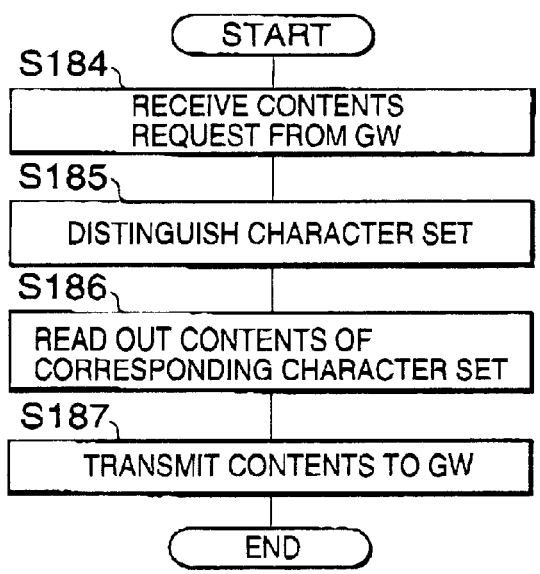
FIG. 25 is a flowchart showing one example of the processing of contents carried out by the server according to the third embodiment.

Referring to FIG. 25, in the server 164, the contents request receiver 180 monitors the reception of the contents server request 168 sent from the GW 161. When the contents request receiver 180 has detected the reception of the contents server request 168 (step S184), the character set distinguisher 181 distinguishes the character set that can be correctly displayed at the terminal 160 and is included in the contents server request 168 (step S185). Then, the contents transmitter 183 reads out the contents corresponding to the character set that has been distinguished by the character set distinguisher 181, from the contents data of the same content prepared for each of the plurality of character sets stored in advance in the contents storage 182 (step S186). The contents transmitter 183 then transmits the read contents to the GW 161 as transmission contents data 170 (step S187).

Example

An example of an operation of the data conversion system having the above-described principle structure will be explained in detail below with reference to FIG. 26.

Figure 26:
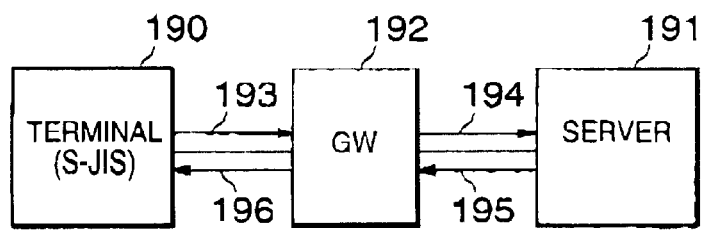
FIG. 26 is a diagram showing a detailed structure of the data conversion system according to the third embodiment.

Referring to FIG. 26, the data conversion system has a structure that a terminal 190 that can display the contents of the character set of the S-JIS is connected with a server 191 that stores the contents data of the same content for each of a plurality of character sets Including the S-JIS, the UNICODE, etc., via a GW 192. The terminal 190 is connected with the GW 192 via a network (not shown). The GW 192 is connected with the server 191 via a network (not shown).

In the data conversion system having the above-described structure, the terminal 190 notifies the GW 192 by describing "Accept-char-S-JIS" in the HTTP header that the terminal-supported character set is the S-JIS. At the same time, the terminal 190 transmits to the GW 192 a contents request 193 that requests for transfer of the contents. Next, the GW 192 transmits to the server 191 the received contents request as a contents server request 194 similarly having "Accept-char=S-JIS" written in the HTTP header, together with the character set that has been set in the terminal 190. The server 191 distinguishes the character set notified by the terminal 190, from the received contents server request 194, and returns the contents data of the S-JIS character set to the GW 192 as transmission contents data 195. The GW 192 analyzes the received contents data using the S-JIS character set, compresses the contents data, and then transmits the compressed contents data to the terminal 190 as contents data 196. The terminal 190 executes the received contents data 196 of the S-JIS character set, and carries out the displaying and other operation control.

As explained above, according to the data conversion system of the third embodiment, the terminal 160 transmits to the GW 161 the terminal-supported character set of the contents together with the contents request. Upon receiving the contents request, the GW 161 distinguishes the character set that is added to this contents request, and at the same time, transmits this contents request to the server 164 as the contents server request. Upon receiving this contents server request, the server 164 distinguishes the character set that has been notified by the terminal 160 and is included in the contents server request. Then, the server 164 returns to the GW 161 the contents of the character set that has been notified from among the contents data stored in advance for each of a plurality of character sets. The GW 161 analyzes the received contents data by the character set that has been distinguished at the time of making the contents request, compresses the contents data, and transmits the compressed contents data to the terminal 160. The terminal 160 receives the contents of the character set that has been notified at the time of making the contents request. Therefore, it is not necessary to convert the character set, which reduces the load of the GW 161. At the same time, it becomes possible to execute and display the received contents at the terminal, without the need of distinguishing the character set at the terminal and other devices.

Fourth Embodiment

Figure 27:
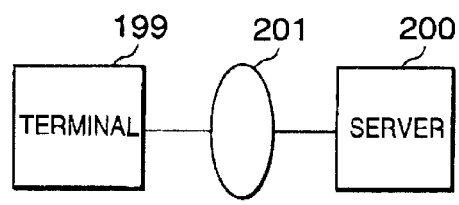
FIG. 27 is a diagram showing a principle structure of a data conversion system according to a fourth embodiment of the present invention.

Referring to FIG. 27, in a data conversion system according to a fourth embodiment of the present invention, a terminal 199 is connected with a server 200 via a network 201. The terminal 199 can observe the contents of a predetermined character set.

First, the terminal 199 transmits to the server 200 a request for the contents together with a terminal-supported character set. Then, the server 200 distinguishes the character set that can be correctly displayed at the terminal 199, converts the contents stored in advance, into the distinguished character set, and transmits the contents to the terminal 199. Thus, it is possible to correctly display the contents at the terminal 199 regardless of the kind of the character set of the contents stored in the server 200.

Key elements of the data conversion system will be explained below. The structure and the operation of the terminal 199 are the same as those of the terminal in the first embodiment, and therefore, their explanation will be omitted.

Server

Figure 28:
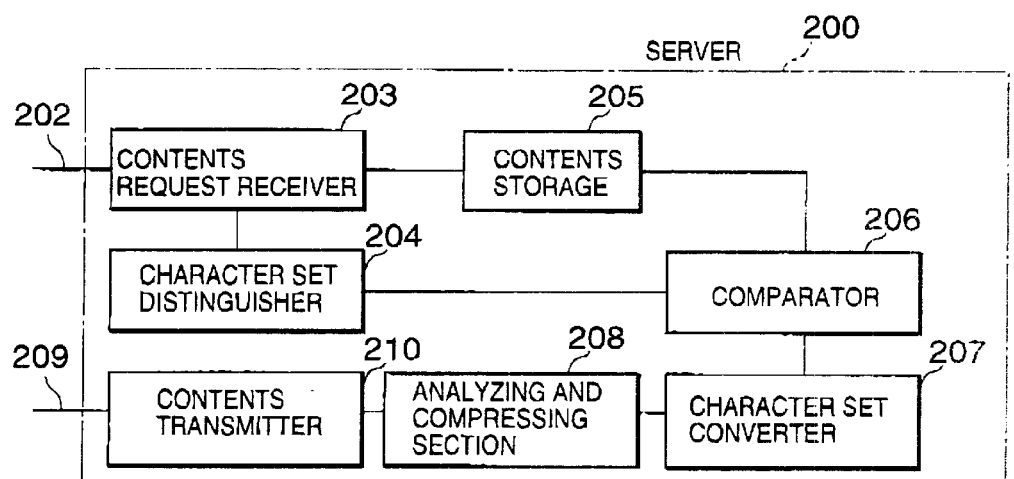
FIG. 28 is a block diagram showing the internal configuration of a server according to the fourth embodiment.

Referring to FIG. 28, the server 200 is equipped with: a contents request receiver 203 that receives a contents request 202 from the terminal 199; a character set distinguisher 204 that distinguishes the character set that has been set in the terminal 199 and has been added to the contents request received by the contents request receiver 203; a contents storage 205 that stores the contents that will be requested by the terminal 199; and a comparator 206 that compares the character set of the contents stored in the contents storage 205 with the character set that has been distinguished by the character set distinguisher 204. The server 200 is further equipped with: a character set converter 207 that converts the character set of the contents data stored in the contents storage 205 into the character set used at the terminal 199 that has been distinguished by the character set distinguisher 204, when the two character sets do not match as a result of the comparison by the comparator 206; an analyzing and compressing section 208 that analyzes the contents by referring to the character set of the terminal and compresses the contents; and a contents transmitter 210 that transmits the compressed contents to the terminal 199 as contents data 209.

This server 200 has a CPU and a ROM, for example, and carries out the following control based on a program stored in this ROM.

Figure 29:
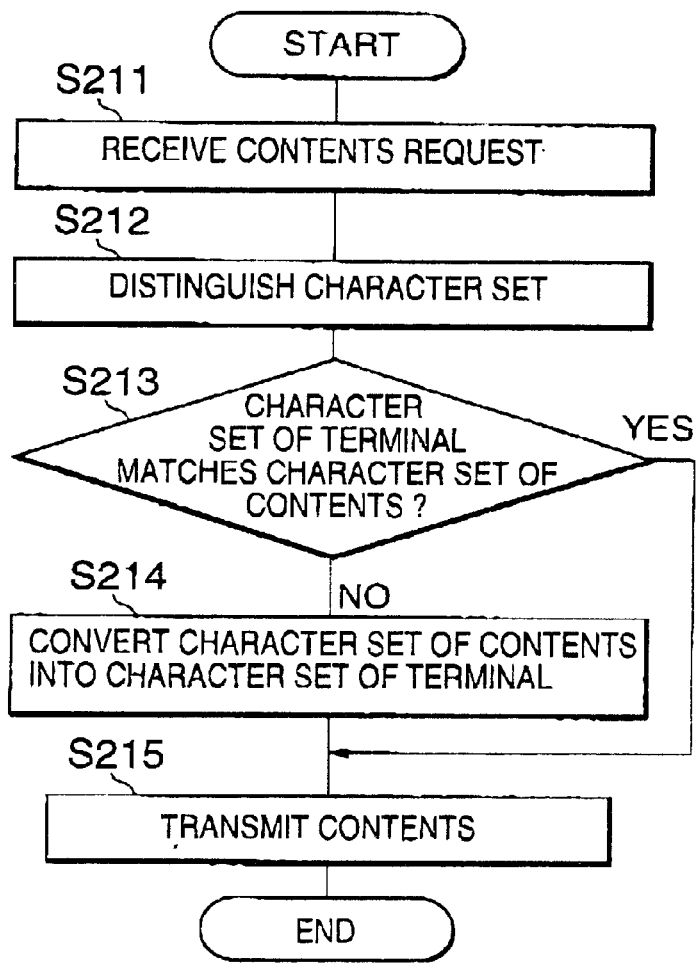
FIG. 29 is a flowchart showing one example of the processing of contents carried out by the server according to the fourth embodiment.

Referring to FIG. 29, the contents request receiver 203 monitors the reception of the contents request 202 from the terminal 199. First, when the contents request receiver 203 has detected the reception of the contents request 15 from the terminal 10 (step S211), the character set distinguisher 204 distinguishes the character set of the terminal 199 that has been added to the contents request 202 (stop S212). Then, the comparator 206 compares the character set of the contents stored in advance in the contents storage with the character set of the terminal 199 distinguished at step S212 to makes a decision as to whether the server-stored character set matches the distinguished character set (step S213).

When a decision has been made that the two character sets do not match (NO in step S213), the character set converter 207 converts the character set of the contents data stored in the contents storage 205 into the character set used at the terminal 199 that has been distinguished by the character set distinguished 204 (step S214). Then, the contents data of the converted character set are transferred to the analyzing and compressing section 208 When a decision has been made that the two character sets match (YES in step S213), the contents data stored in the contents storage 205 are transferred to the analyzing and compressing section 208.

The analyzing and compressing section 208 analyzes the contents data using the character set of the terminal, and compresses the contents data to reduce the amount of transfer data. Thereafter, the contents transmitter 210 transmits the compressed contents data to the terminal 199 as contents data 209 (step S215).

Example

An example of an operation of the data conversion system having the above-described principle structure will be explained in detail below with reference to FIG. 30 and FIG. 31.

Figure 30:
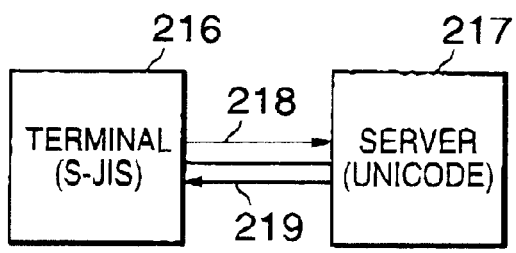
FIG. 30 is a diagram showing a detailed structure of the data conversion system according to the fourth embodiment.

As shown in FIG. 30, the data conversion system has a 5 structure that a terminal 216 that can correctly display the contents of the character set of the S-JTS is connected with a server 217 that stores the contents of the character set of the UNICODE via a network (not shown).

In the data conversion system having the above-described structure, the terminal 216 notifies the server 217 by describing "Accept-char=S-JIS" In the HTTP header that the terminal-supported character set is the S-JIS. At the same time, the terminal 216 transmits to the server 217 a contents request 218 that requests for a transmission of the contents.

When receiving this contents request 218 from the terminal 216, the server 217 distinguishes the character set added to the contents request 218 as the S-JIS. The server 217 makes a decision as to whether or not this character set matches the UNICODE that is the character set of the contents stored 20 in advance. Since the two character sets do not match, the server 217 converts the character set of the contents data stored in the server 217 into the S-JIS character set that is used at the terminal 216. Then, the server 217 transmits the contents data of the converted character set to the terminal 216 as contents data 219. The terminal 216 executes the received contents data 219 of the S-JIS character set, and carries out the displaying and other operation control.

The server 217 that carries out the conversion of the character set has a CPU not shown, and can carry out the above-described conversion processing according to a control program stored in the ROM.

Figure 31:
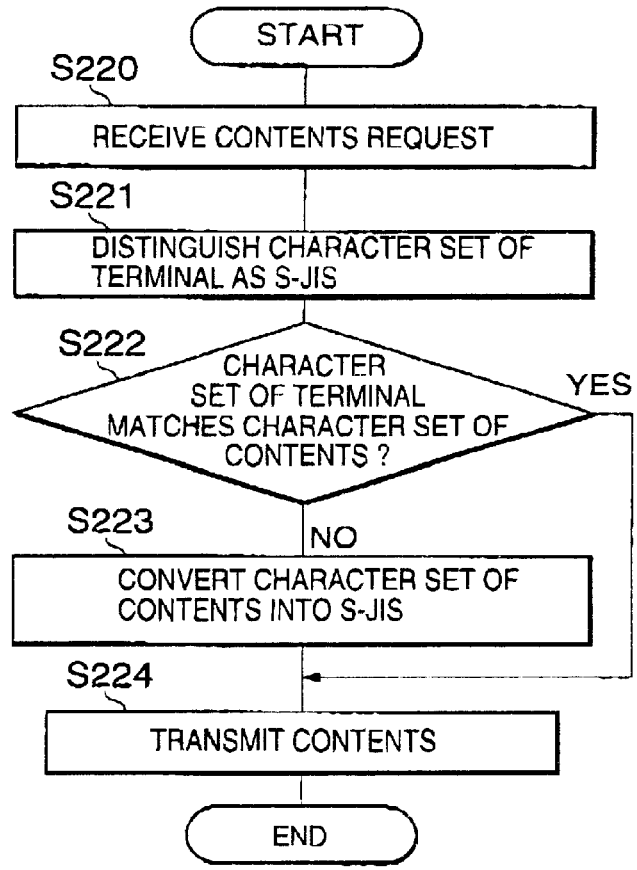
FIG. 31 is a flowchart showing the processing of contents carried out by the server in the detailed structure of the data conversion system according to the fourth embodiment.

Referring to FIG. 31, the server 217 receives from the terminal 216 the contents request 218 that Is added with a notification that the character set that can be correctly displayed is the S-JIS (step S220). Then, the character set distinguisher of the server 217 distinguishes the character set of the terminal 216 as the S-JIS (step S221). The server 217 compares the character set of the contents stored in advance in the server, 217 with the S-JIS that is the character set of the terminal 216 distinguished at step S221 (step S222). The character set of the contents stored in the server 217 is the UNICODE, and the two character sets do not match (NO in step S222). The server 217 then converts the character set of the contents stored in the server 217 into the S-JIS that is the character set of the terminal 216 (step S223). The server 217 then analyzes the contents data using the S-JIS, and encodes or compiles the contents data into binary data, thereby compressing the contents data. The server 217 transmits the compressed contents data to the terminal 216 as the contents data 219 (step S224). When the two character sets match as a result of the comparison at step S222 (YES in step S222), the server 217 analyzes and compresses the contents data, and transmits the contents data 219 to the terminal 216 (step S224).

As explained above, according to the data conversion system of the fourth embodiment, the terminal 199 transmits to the server 200 the terminal-supported character set of the contents together with the contents request. Upon receiving the contents request, the server 200 distinguishes the character set that is added to this contents request. The server 200 stores the contents that will be requested by the terminal 199. The server makes a decision as to whether or not the character set of the contents stored In the terminal 199 matches the character set of the terminal 199 that has been notified by the contents request. When both character sets do not match, the server 200 converts the character set of the contents stored in the server 200 into the character set of the contents of the terminal 199, and transmits the contents data of the converted character set to the terminal 199. The terminal 199 receives the contents of the character set that has been notified at the time of making the contents request. Therefore, it becomes possible to execute and display the received contents at the terminal, without the need of distinguishing the character set at the terminal, regardless of the kind of character set of the contents stored in the server 200. Further, it is not necessary to provide an additional device like the GW.

Fifth Embodiment

Figure 32:
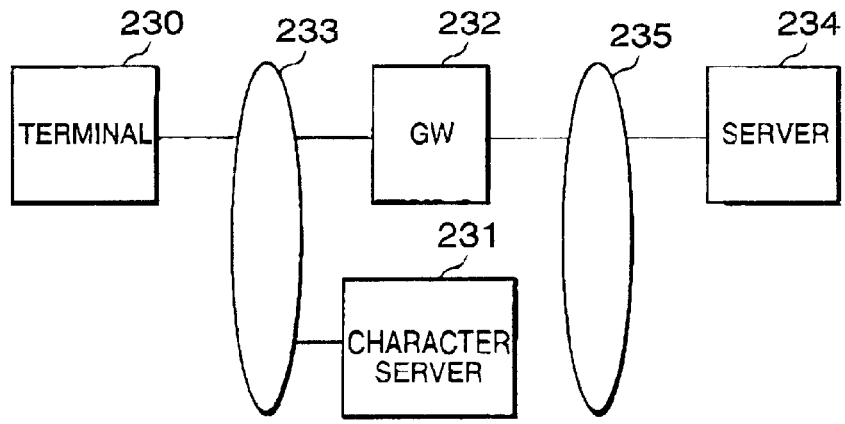
FIG. 32 is a diagram showing a principle structure of a data conversion system according to a fifth embodiment of the present invention.

Referring to FIG. 32, in a data conversion system according to a fifth embodiment of the present invention, d terminal 230 is connected with a character server 231 and a GW 232 via a network 233, the character server 2311 storing modules for carrying out processes corresponding to various character sets. The GW 232 is connected with a server 234 via a network 235. The terminal 230 can correctly display the contents of a predetermined character set.

First, the terminal 230 transmits to the GW 232 via the network 233 a request for the contents together with a terminal-supported character set. Then, the GW 232 distinguishes the character set that can be correctly displayed at the terminal 230. When the character set of the contents received from the server 234 in response to the contents request made from the terminal 230 is the same as the character set used at the terminal, the GW 232 transmits the contents as it is to the terminal 230 by adding the character set information to the contents data. When the character set of the contents received by the GW 232 from the server 234 is not the same as the character set used at the terminal, the GW 232 obtains the processing module for processing the character set of the contents received from the server 234 selected from the respective processing modules corresponding to a plurality of character sets stored in the character server 231. Then, the GW 232 further adds this obtained processing module to the contents data, and transmits it to the terminal 230. The terminal 230 refers to the character set information that is added to the received contents data.

When the character set of the received contents data is the same as the character set of the terminal, the terminal 230 processes the contents data as it is. On the other hand, when the character set of the received contents data is different from the character set of the terminal, the terminal 230 processes the contents data by the processing module that has been received together with the contents data. As a result, the terminal 230 can correctly display the received contents by the processing corresponding to the character set of the received contents data, regardless of the kind of the character set of the contents data stored in the server 231.

Key elements of the data conversion system will be explained below. The structure and the operation of the server 234 are the same as those of the server 84 in the second embodiment, and therefore, their explanation will be omitted. Further, the structure and the operation of the character server 234 of the data conversion system according to the fifth embodiment are the same as those of the character server 81 in the second embodiment, except that the character server 231 returns the requested processing module to the GW 232 in response to the processing module request from the GW 232. Therefore, their explanation will be omitted.

Terminal

Figure 33:
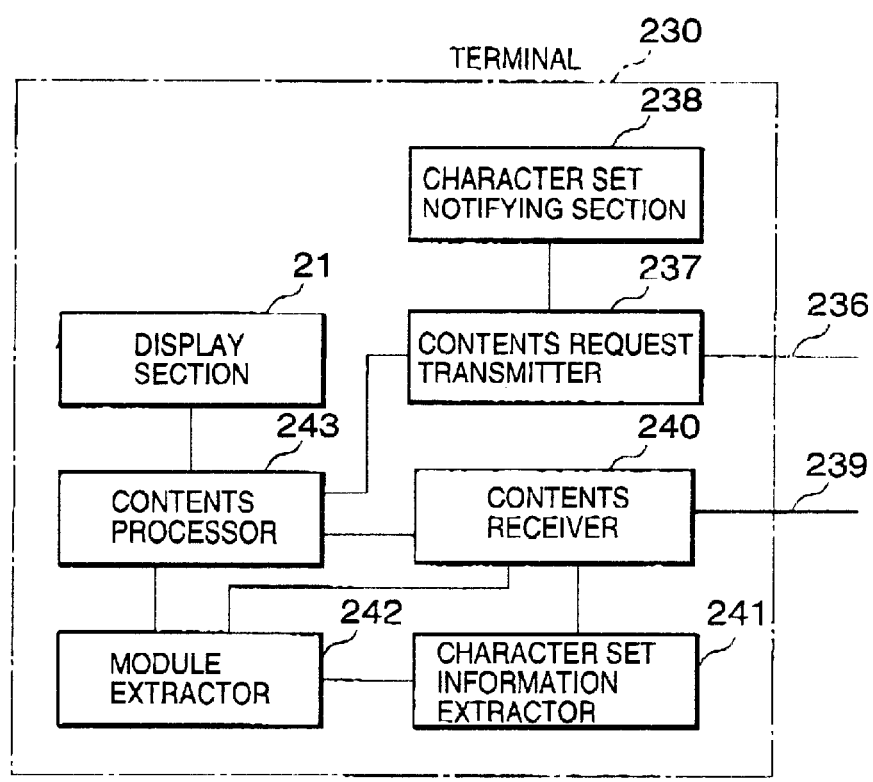
FIG. 33 is a block diagram showing the internal configuration of a terminal according to the fifth embodiment.

Referring to FIG. 33, blocks corresponding to those of the terminal 10 in the first embodiment shown in FIG. 2 are denoted by the same reference numerals, and their explanation will be suitably omitted. The terminal 230 is equipped with: a contents request transmitter 237 that transmits a contents request 236 to the server 234 via the GW 232; a character set notifying section 238 that adds a character set that has been set in advance for the contents that can be correctly displayed to the contents request 236; a contents receiver 240 that receives contents data 239 from the server 234 via the GW 232 in a response to the contents request 236; a character set information extractor 241 that extracts character set information showing a character set of the contents that are added to the received contents data 239; a module extractor 242 that extracts a module for processing the character set of the contents added to the contents data in a similar manner; a contents processor 243 that executes the received contents by building this processing module thereto and carries out the displaying and other operation control; and a display section 21 that displays a result of the processed contents data.

This terminal 230 has, for example, a CPU and a ROM, and carries out the following control based on a program stored in this ROM.

Figure 34:
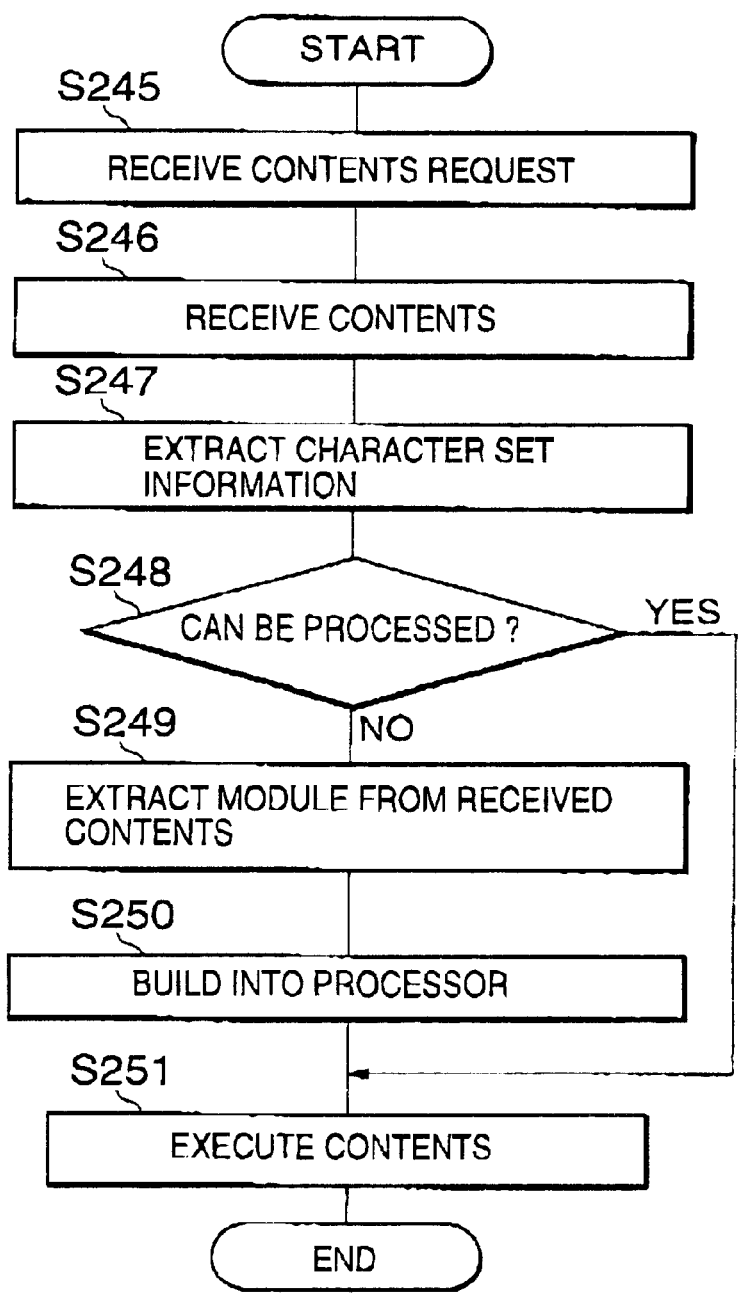
FIG. 34 is a flowchart showing one example of the processing of contents carried out by the terminal according to the fifth embodiment.

Referring to FIG. 34, the contents request transmitter 237 transmits to the GW 232 the contents request 236 to the server 234 that requests for transfer of the contents that can be correctly displayed and has been set in advance (step S245). For this purpose, the character set notifying section 238 of the terminal 230 adds the character set that has been set in advance in the terminal 230 to the contents request 236 to be transmitted from the contents request transmitter 237.

As a response to the contents request 236 transmitted at step S245, the contents receiver 240 receives the contents data 239 from the server 234 via the GW 232 (step S246).

Then, the character set information extractor 241 extracts the character set information that shows the character set of the contents added to the contents data 239 (step S247). The module extractor 242 refers to the character set information, and makes a decision as to whether it is possible or not to correctly display the contents of the character set shown by the character set information (step S248).

At this point of time, assuming that a processing module Corresponding to the character set shown by the extracted character set Information has not been built Into the contents processor of the terminal 23o, it is not possible to correctly display the received contents at the terminal 230. Therefore the module extractor 242 makes a decision that it is not possible to process the contents (NO in step S248). The module extractor 242 extracts the module for processing the character set that is added to the contents data 239 (step S249). When the processing module has been obtained, this obtained module is built into the contents processor 243 (step S250). The contents processor 243 executes the contents received by the contents receiver 240 to carry out the displaying and other operation control (step S251).

On the other hand, at step S248, when the received character set is the same as the character set of the terminal or the same as the character set that has been received previously, and also when the processing module corresponding to this character set has already been built into the terminal, it is possible to correctly display the contents of the character set shown by the extracted character set information. Therefore, a decision is made that it is possible to process the contents received by the contents receiver 240 (YES in step 248). Thus, the contents processor 243 executes the contents received by the contents receiver 240 to carry out the displaying and other operation control (step S251).

Gateway

Figure 35:
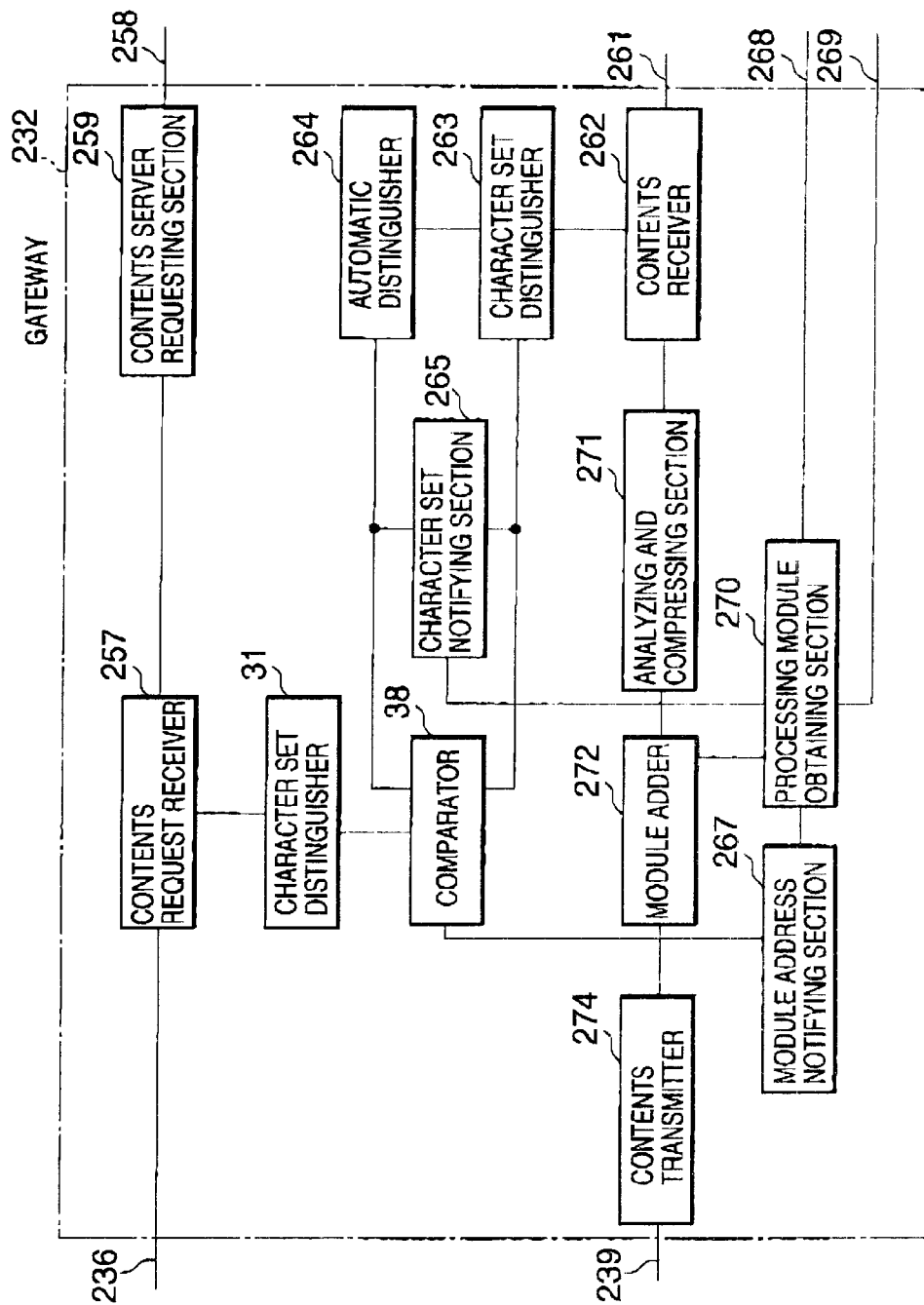
FIG. 35 is a block diagram showing the Internal configuration of a gateway according to the fifth embodiment.

Referring to FIG. 35, blocks that are the same as those of the GW 11 in the first embodiment shown in FIG. 4 are denoted by the same reference numerals, and their explanation will be suitably omitted.

The GW 232 is equipped with: a contents request receiver 257 that receives the contents request 236 from the terminal 230; a character set distinguisher 31 that distinguishes the character set that has been set in the terminal 230 and has been added to the contents request received by the contents request receiver 257; and a contents server requesting section 259 that transmits the contents request to the server 234 as a contents server request 258.

The GW 232 is further equipped with, a contents receiver 262 that receives transmission contents data 261 from the server 234 as a response to the contents request 236 received from the terminal 230; a character set distinguisher 263 that distinguishes the character set of the contents data received by the contents receiver 262; an automatic distinguisher 264 that automatically distinguishes the character set from the contents in a similar manner to that of the automatic distinguisher 37 in the first embodiment, when the character set distinguisher 263 cannot distinguish the character set; and a character set notifying section 265 that adds to the contents data the character set that has been distinguished by the character set distinguisher 263 or the automatic distinguisher 264, as character set information.

The GW 232 is further equipped with: a comparator 38 that compares the character set that has been distinguished by the character set distinguisher 263 or the automatic distinguisher 264 with the character set of the terminal 230 distinguished by the character set distinguisher 31; a module address notifying section 267 that notifies the address of the processing module stored in the character server 231 corresponding to the character set of the contents data that has been distinguished by the character set distinguisher 263 or the automatic distinguisher 264, when the two character sets do not coincide with each other as a result of the comparison by the comparator 38; and a processing module obtaining section 270 that obtains a processing module 269 by transmitting to the character server 231 a module request 268 that is added with an address notified by the module address notifying section 267 from the character server 231.

The GW 232 is further equipped with: an analyzing and compressing section 271 that analyzes and compresses the contents by referring to the character set of the contents received by the contents receiver 262; a module adding section 272 that adds to the compressed contents the processing module obtained by the processing module obtaining section 270: and a contents transmitter 274 that transmits to the terminal 230 the contents data 239 that is added with the character set information and the processing module.

This GW 232 has a CPU and a ROM, for example, and carries out the following control based on a program stored in this ROM.

Figure 36:
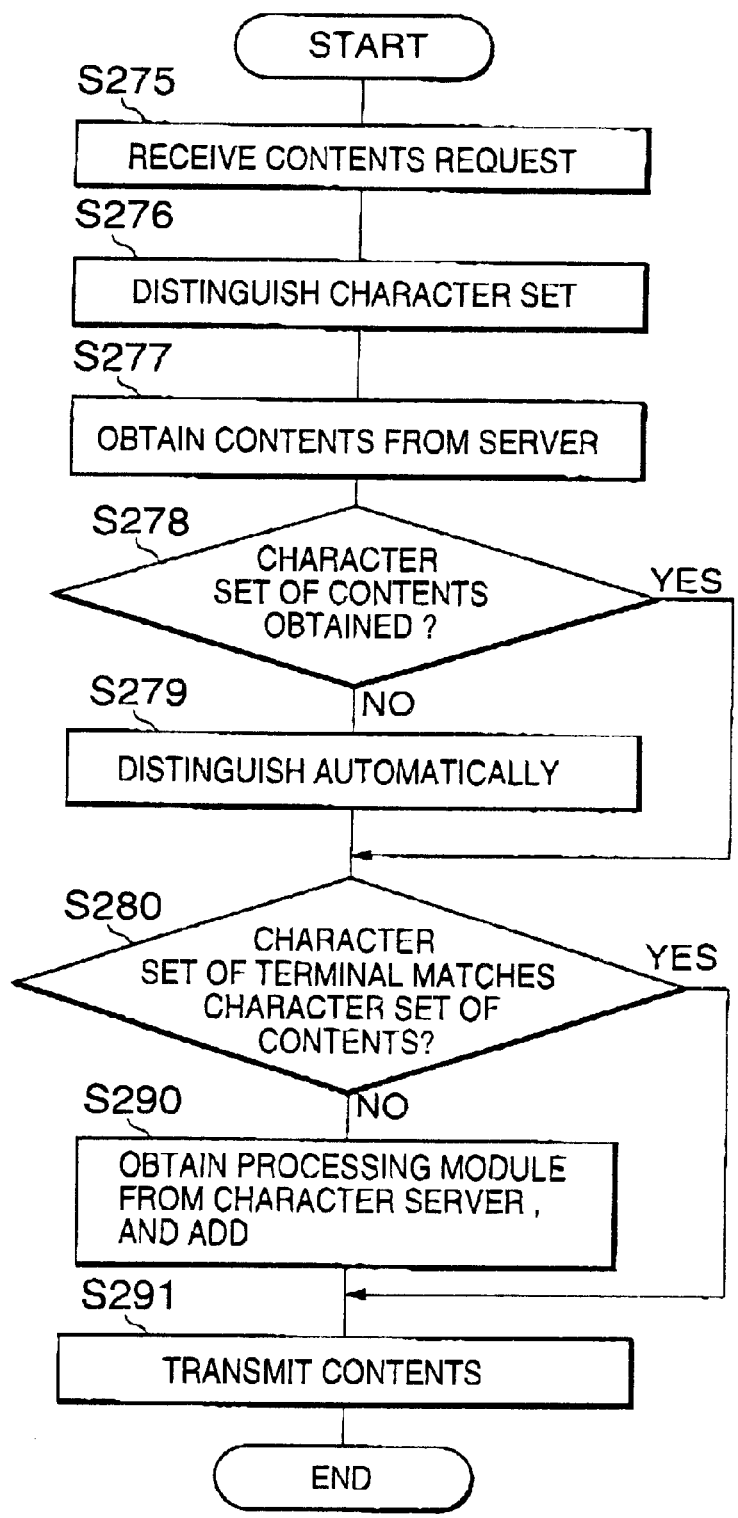
FIG. 36 is a flowchart showing one example of the processing of contents carried out by the gateway according to the fifth embodiment.

Referring to FIG. 36, the contents request receiver 257 monitors the reception of the contents request 236 from the terminal 230. First, when the contents request receiver 257 has detected the reception of the contents request 236 from the terminal 230 (step S275), the character set distinguisher 31 distinguishes the character set of the terminal 230 that has been added to the contents request 236 (step S276). Then, the contents server requesting section 259 transmits the contents server request 258 to the server 234, and the contents receiver 262 monitors the reception of transmission contents data 261 from the server 234. When the transmission contents data 261 has been received from the server 234 (step S277), the character set distinguisher 263 distinguishes the character set of the received contents data (step S278).

When it has not been possible to distinguish the character set of the contents (NO in step S278), the automatic distinguisher 264 automatically distinguishes the character set of the contents from the contents (step S279).

When it has been possible to distinguish the character set of the contents (YES in step S278) or when the character set of the contents has been automatically distinguished at step S279, the comparator 38 compares the character set of the contents distinguished at step S278 or step S279 with the character set of the terminal 230 distinguished by the character set distinguisher 31 to makes a decision as to whether or not they match (step S280).

When the comparator 38 has made a decision that the two character sets do not match (NO in step S280), the processing module obtaining section 270 obtains from the module address notifying section 267 the address of the processing module that is stored in the character server 231 corresponding to the character set of the received contents and has been distinguished at step S278 or step S279. The processing module obtaining section 270 then transmits the processing module request 268 to the character server 231. The processing module obtaining section 270 then obtains the processing module 269 of the character set of the contents.

The analyzing and compressing section 271 analyzes the contents data received by the contents receiver 262 by the character set of the contents, and encodes or compiles the contents data into binary data, thereby compressing the contents data. Then, the character set notifying section 265 adds the character set information that shows the character set distinguished by the character set distinguisher 263 or by the automatic distinguisher 264, and the processing module, when the comparator has decided that the two character sets do not match, to the compressed contents data (step S290). Thereafter, the contents transmitter 274 transmits the compressed contents data with this addition to the terminal 230 as the contents data 239 (step S291).

On the other hand, when a decision has been made that the two character sets coincide with each other (YES in step S280), the analyzing and compressing section 271 analyzes the contents data received by the contents receiver 262 by the character set of the contents, and encodes or compiles the contents data into binary data, thereby compressing the contents data. Then, the character set notifying section 265 adds the character set information that shows the character set distinguished by the character set distinguisher 263 or by the automatic distinguisher 264, to the compressed contents data.

Thereafter, the contents transmitter 274 transmits the compressed contents data with this addition to the terminal 230 as the contents data 239 (step S291).

Example

An example of an operation of the data conversion system having the above-described principle structure will be explained in detail below with reference to FIG. 37.

Figure 37:
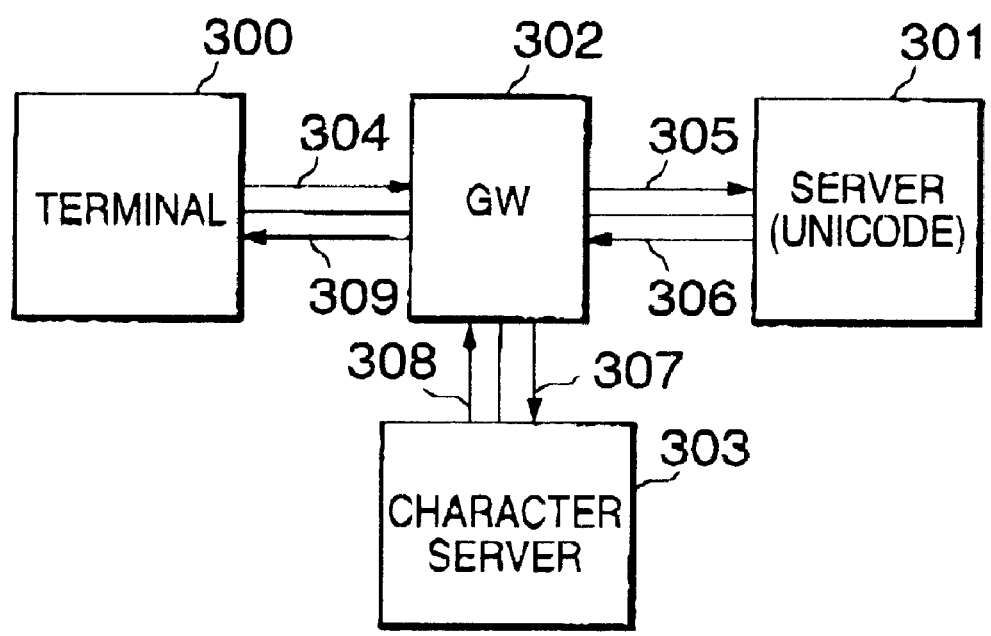
FIG. 37 is a diagram showing a detailed structure of the data conversion system according to the fifth embodiment.

Referring to FIG. 37, the data conversion system has a structure that a terminal 300 that can observe the contents of the character set of the S-JIS is connected with a server 301 that stores the contents of the character set of the UNICODE via a GW 302. The GW 302 is connected with a character server 303 that stores processing modules for processing character sets corresponding to the character sets of the S-JIS, the UNICODE and the like. The terminal 300, the GW 302 and the character server 303 are connected with each other via a network (not shown). The GW 302 Is connected with the server 301 via a network (not shown).

In the data conversion system having the above-described structure, the terminal 300 transmits to the GW 302 a contents request 304 having "Accept-char=S-JIS" written in the HTTP header thereof. In this way, the terminal 300 informs the GW 302 that the character set that can be correctly displayed is the S-JIS, and at the same time, requests the transmission of the contents from the GW 302.

Next, the GW 302 transmits a contents server request 305 requesting for a transfer of the contents that has the same description of "Accept-char=S-JIS" in the HTTP header, to the server 301. The server 301 sends the contents of the character set UNICODE directly back to the GW 302. The GW 302 receives the transmission contents data 306 thus transmitted from the server 301. The GW 302 distinguishes the character set of the received contents as the UNICODE, and adds this character set to contents data 306 as the character information. Since the character set UNICODE of the contents data is different from the character set S-JIS of the terminal, the GW 302 transmits a module request 307 to the character server 303 by using the module address that specifies the storage location in the character server 303 of the processing module that processes the UNICODE that is the character set of the received contents. The character server 303 returns to the GW 302 the processing module of the address specified by the received module request 307, as a processing module 308.

The GW 302 further adds the received processing module 308 to the contents received from the server 301, and transmits the contents with this addition to the terminal 300 as contents data 309. When this contents data 309 has been received, the terminal 300 extracts the character set information, and distinguishes the received character set Of the contents as the UNICODE. At this point of time, since the character set that can be processed at the terminal 300 is the S-JIS, the terminal 300 makes a decision that it is impossible to process the received contents. Thus, the terminal 300 builds this UNICODE processing module added to the contents data 309 into the contents processor of the terminal 300, and executes the contents received from the server, and carries out the displaying and other operation control.

The terminal 300 and the GW 302 that make it possible to display the contents by obtaining the processing module have a CPU (not shown), and can carry out the above-described processing according to a control program stored in the ROM.

Figure 38:
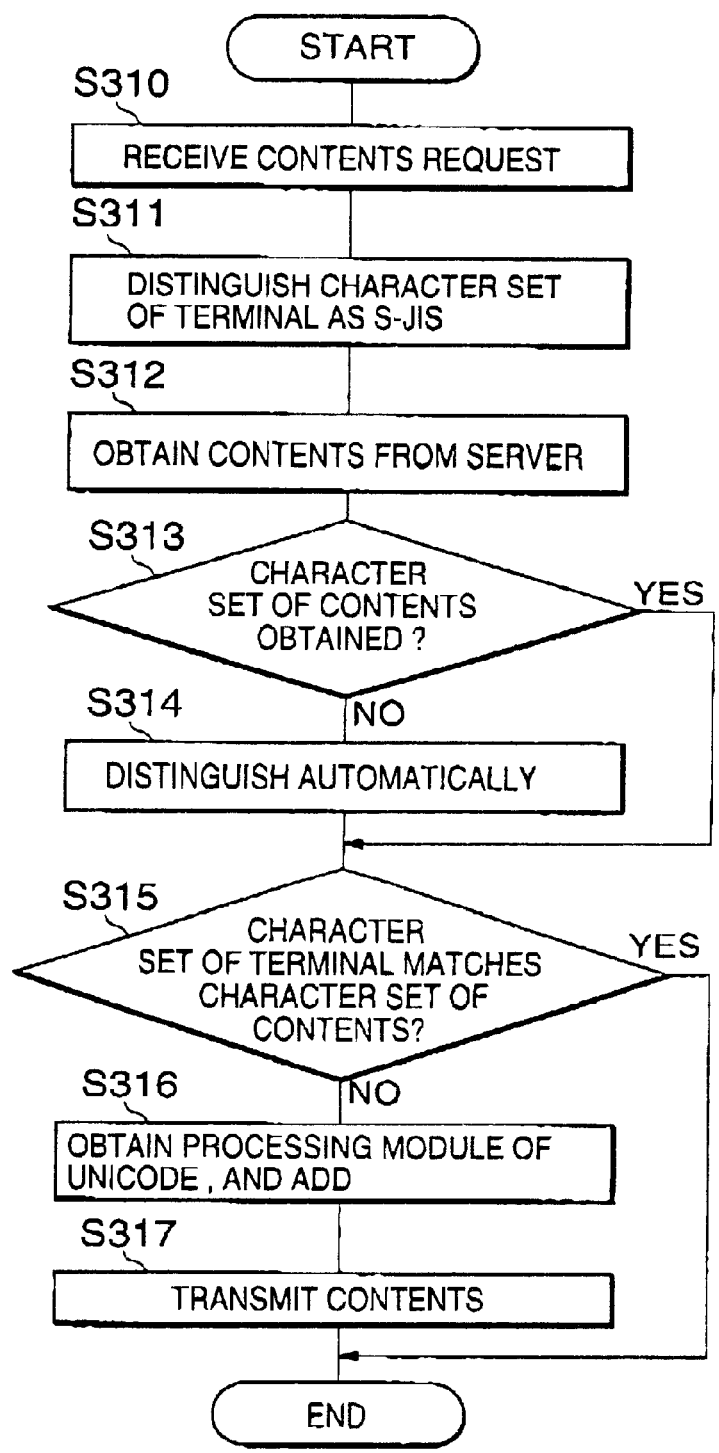
FIG. 38 is a flowchart showing the processing of contents carried out by the gateway in the detailed structure of the data conversion system according to the fifth embodiment.

Referring to FIG. 38, the GW 302 receives from the terminal 300 the contents request 304 that is added with a notification that the character set that can be correctly displayed is the S-JIS (step S310). Then, the character set distinguisher of the GW 302 distinguishes the character set of the terminal 300 as the S-JIS (step S311). The GW 302 requests the server 301 for the return of the contents that has been indicated in the received contents request 304, by using this contents request 304 as the contents server request 305.

The GW 302 receives the transmission contents data 306 from the server 301, and obtains the indicated contents (step S312). The GW 302 then distinguishes the character set of the contents by referring to the protocol header or the contents data of a contents data packet. When the character set has not been distinguished (NO in step S313), the automatic distinguisher automatically distinguishes the character set from the contents (step S314).

Figure 39:
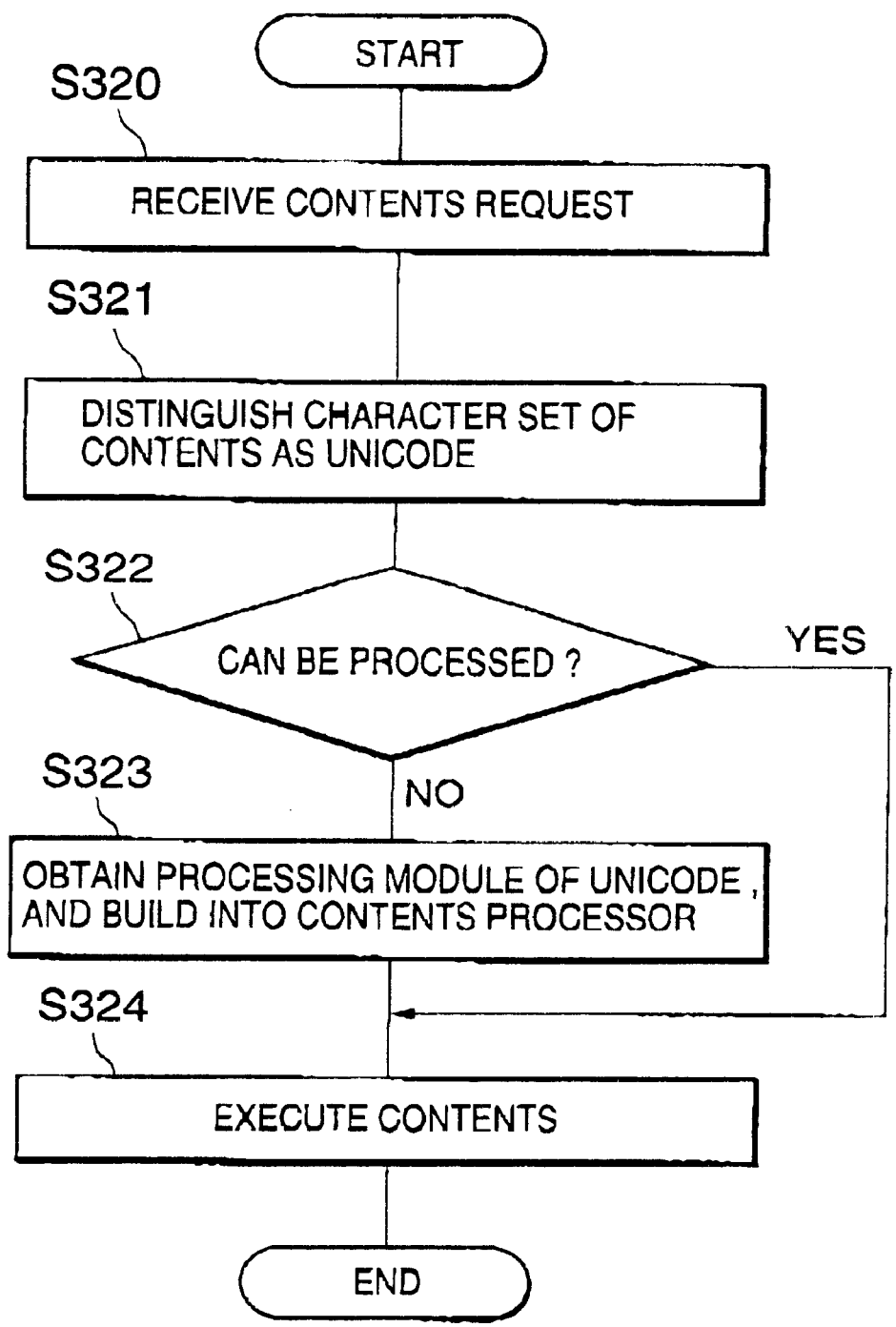
FIG. 39 is a flowchart showing the processing carried out by the terminal in the detailed structure of the data conversion system according to the fifth embodiment.

The character set of the UNICODE that has been distinguished from the protocol header or the contents data of the contents data packet (YES in step S313) or distinguished from the contents (step S314) is added to the contents data 309 as the character set information The UNICODE as the character set of the contents is compared with the S-JIS that is the character set notified as an addition to the contents request from the terminal (step S315). Since the two character sets do not match (NO in step S315), the processing module for processing the UNICODE is obtained from a plurality of processing modules stored in the character server 303, and the obtained processing module is also added to the contents data 309. Then, the contents data 309 is transmitted to the terminal 300 (step S317). When the two character sets match (YES in step S315), the contents data added with only the character set information is transmitted (step S317), Referring to FIG. 39, the terminal 300 transmits to the server 301 via the GW 302 the contents request 304 that requests for the transmission of the contents as well as the notification that the terminal-supported character set is the S-JIS (step S320). Then, the terminal 300 receives from the server 301 via the GW 302 the contents data 309 as a response to the contents request 304 that has been transmitted at step S320.

The terminal 300 extracts the character set information added to this contents data 309, and distinguishes the character set of the received contents data as the UNICODE (step S321). Next, the terminal 300 refers to the character set information and makes a decision as to whether it is possible to process the received contents or not (step S322). At this point of time, since the terminal 300 can execute the contents by the character set of the S-JIS, it is not possible to process the received contents of the UNICODE character set. Therefore, the terminal 300 decides that it is not possible to process the contents (NO in step S322). Thus, the terminal 300 extracts the UNICODE processing module from the received contents data 309, and builds this processing module into the contents processor (step S323). The contents processor then executes the received contents of the UNICODE character set, and carries out the displaying and other operation control (step S324).

When the UNICODE processing module has already been built into the terminal 300, the terminal 300 makes a decision that it is possible to process the received contents (YES in step S322). Then, the terminal 300 directly executes the received contents of the UNICODE character set, and carries out the displaying and other operation control (step S324).

As explained above, according to the data conversion system of the fifth embodiment, the terminal 230 transmits to the GW 232 the contents request 236 including the terminal-supported character set of the contents. Upon receiving the contents request 236, the GW 232 distinguishes the character set that is added to this contents request 236, and at the same time, transmits the contents request straight to the server 234 as the contents server request 238. Upon receiving this contents server request 238, the server 234 returns to the GW 232 the contents that have been stored in advance corresponding to this request. The GW 232 either distinguishes the character set by referring to the protocol header or the like of the contents from the server 234 or automatically distinguishes the character set from the contents, in a similar manner to that of the automatic distinguisher 37 in the first embodiment. When the character set of the contents and the character set of the terminal do not match, the GW 232 transmits the module request 268 to the character server 231 by using the module address that specifies the storage location of the processing module for processing the character set stored in the character server 231 corresponding to the character set that has been distinguished from the contents. Thus, the GW 232 obtains the processing module of the received contents. The GW 232 adds the character set information showing the character set detected from the contents, and the obtained processing module 269, to the contents received from the server 234. The GW 232 then transmits the contents with these additions to the terminal 230. When the terminal 230 cannot process the character set of the received contents, the terminal 230 builds the processing module received together with the contents data, into the contents processor. Then, the terminal 230 executes the contents received from the server 234. Based on this arrangement, it is possible to correctly display the contents at the terminal 230 without the need of distinguishing the character set at the terminal side, regardless of the kind of the character set of the contents stored in the server 234. Particularly, in the case of a narrow-band network and in the case of a limited processing capacity of the terminal 230, it is possible to reduce the network load between the terminal 230 and the GW 232 as well as to reduce the processing load of the server 234 and the GW 232, respectively.

It has been explained that the character set of the contents is converted in the data conversion system according to the above embodiments. However, the data conversion is not limited to these. For example, it is also possible to apply the data conversion system to the data conversion of text data that is managed by the file server on the network and is shared among a plurality of clients. Further, it is also possible to apply the data conversion system of this invention to a system that converts the character set for each client even when the processing capacity at the client side is low.

As explained above, according to one aspect of the present invention, the data requesting side notifies the requested side of a kind of the data that can be processed at the data requesting side. With this arrangement, even when the kind of data requested is different from the kind of data that can be processed at the data requesting side, the data requesting side can receive the converted data corresponding to the supported kind of the data. Therefore, the data requesting side does not need to distinguish the kind of the data to be processed or to convert the kind of the data correspondingly.

Further, according to another aspect of the present invention, the processing module memory stores a plurality of processing modules each corresponding to all desired kinds of data processing. Therefore, the processing module can meet the requirement of any kind of data processing without a limit to the kind of data that can be processed at the data requesting side.

Further, according to still another aspect of the present invention, there are prepared in advance a plurality of kinds of data of the same content that have been converted into various kind of data processing. Therefore, it is not necessary to carry out any data conversion in a series of data conversion processing to meet the requirement of the data requesting side. As a result, it is possible to substantially reduce the processing load of the whole system.

Further, according to still another aspect of the present invention, the data added with the corresponding processing module is transmitted to the data requesting side, regardless of the kind of the data that can be processed at the data requesting side. Therefore, it is not necessary to convert the data at the data receiving side. As a result, it is possible to reduce the load of the data receiving side.

Further, according to still another aspect of the present invention, the character set that has been set in advance at the terminal side is notified to a second device when transmitting a data request to a first device. With this arrangement, the second device can receive the data from the first device and converts its character set into the supported character set of the terminal. Therefore, even when the character set of the terminal is different from the character set of the requested data stored In advance in the first device, the terminal can receive the data of the supported character set. Therefore, it is not necessary to distinguish or convert the character set at the terminal side. As a result, it is possible to reduce the processing capacity of the terminal, which leads to a reduction in the size of the terminal.

Further, according to still another aspect of the present invention, a third device stores in advance the processing modules each corresponding to desired character sets. Therefore, it is possible to process the data of any kind of character set, without limiting to the character set that has been set in advance at the terminal side. As a result, it is possible to process any kind of character set of the data, even when there is a limit to the processing capacity of the terminal.

Further, according to still another aspect of the present invention, the data of the same content are prepared for various character sets in advance. Therefore, it is not necessary to convert any character set at all for the contents data of various character sets. As a result, it is possible to substantially reduce the processing load of the terminal as well as a first device.

Further, according to still another aspect of the present invention, the character set that has been set in advance at the terminal side is notified to the data transmitting side. With this arrangement, it is possible to receive the data of which character set has been converted into the posted character set of the terminal, even when the character set of the terminal is different from the character set of the requested data stored in advance in a first device. Therefore, it is not necessary to distinguish the character set and carry out the corresponding conversion at the terminal side. Further, since the second device is not necessary unlike the case described above, it is possible to simplify the system. As a result, it is possible to meet any desired character set even when there is a limit to the processing capacity of the terminal. Further, is becomes possible to provide the system at low cost.

Further, according to still another aspect of the present invention, the terminal can receive the data added with the corresponding processing module, regardless of the character set that has been set in advance at the terminal side. Therefore, the terminal may simply process the received data by using the processing module added to this data. As a result, it is possible to substantially reduce the processing load of the terminal.

What is claimed is:

1. A system comprising:
   a server storing predetermined data:
      a data requesting terminal for requesting the predetermined data from the server; and
      a network for connecting the server and the data requesting terminal,
      wherein
         the data requesting terminal comprises:
            a character code sender for sending a terminal-supported character code to the network when transmitting a data request to the network, wherein the terminal-supported character code is supported in the data requesting terminal, and
         the network comprises:
            a node for receiving the predetermined data from the server in response to the data request received from the data requesting terminal and, when a character code of the predetermined data is different from the terminal-supported character code, converting the character code of the predetermined data to the terminal-supported character code before transmitting the predetermined data of the terminal-supported character code to the data requesting terminal.

2. A system comprising:
   a server storing predetermined data:
      a data requesting terminal for requesting the predetermined data from the server; and
      a network for connecting at least the server and the data requesting terminal,
      wherein
         the network comprises:
            a character code server for storing a plurality of character code processing modules each corresponding to a plurality of character codes; and
            a node for receiving the predetermined data from the server in response to a data request received from the data requesting terminal and, when a character code of the predetermined data is different from the terminal-supported character code, receiving a module address of a character code processing module corresponding to the terminal-supported character code from the character code server to send a combination of the predetermined data and the module address to the data requesting terminal, and
         the data requesting terminal comprises:
            a character code sender for sending a terminal-supported character code to the network when transmitting the data request to the network, wherein the terminal-supported character code is supported in the data requesting terminal;
            a receiver for receiving a character code processing module corresponding to the terminal-supported character code from the character code server based on the module address received from the node; and
            a converter for converting the character code of the predetermined data to the terminal-supported character code by executing the character code processing module corresponding to the terminal-supported character code.

3. A system comprising:
   a server storing predetermined data:
      a data requesting terminal for requesting the predetermined data from the server; and
      a network for connecting at least the server and the data requesting terminal,
      wherein
         the network comprises:
            a character code server for storing a plurality of character code processing modules each corresponding to a plurality of character codes; and
            a node for receiving the predetermined data from the server in response to a data request received from the data requesting terminal and, when a character code of the predetermined data is different from the terminal-supported character code, receiving a character code processing module corresponding to the terminal-supported character code from the character code server to send a combination of the predetermined data and the character code processing module to the data requesting terminal, and
         the data requesting terminal comprises:
            a character code sender for sending a terminal-supported character code to the network when transmitting the data request to the network, wherein the terminal-supported character code is supported in the data requesting terminal; and
            a converter for converting the character code of the predetermined data to the terminal-supported character code by executing the character code processing module received from the node.

4. A system comprising:
   a server storing predetermined data:
      a data requesting terminal for requesting the predetermined data from the server; and
      a network for connecting the server and the data requesting terminal,
      wherein
         the data requesting terminal comprises:
            a character code sender for sending a terminal-supported character code to the server when transmitting a data request to the server, wherein the terminal-supported character code is supported in the data requesting terminal, and
         the server comprises:

a storage for storing the predetermined data described in a plurality of character codes; and a data sender for sending the predetermined data of a character code that Is the same as the terminal-supported character code to the data requesting terminal.

5. A system comprising:

a server storing predetermined data:

a data requesting terminal for requesting the predetermined data from the server; and a network for connecting the server and the data requesting terminal, wherein the data requesting terminal comprises:

a character code sender for sending a terminal-supported character code to the server when transmitting a data request to the server, wherein the terminal-supported character code is supported in the data requesting terminal, and the server comprises:

a converter for converting a character code of the predetermined data to the terminal-supported code when the character code of the predetermined data is different from the terminal-supported code; and a data sender for sending the predetermined data of the terminal-supported code to the data requesting terminal.

6. A data conversion system implemented in a network, comprising:

data request transmitting means for transmitting a data request for obtaining predetermined data, the data request having a supported processing kind of data added thereto;

first distinguishing means for distinguishing the supported processing kind of data based on the data request transmitted by the data request transmitting means;

data storage means storing the predetermined data;

request receiving means for receiving the data request from the data request transmitting means;

data transmitting means for transmitting the predetermined data stored in the data storage means when the data request receiving means has received the data request;

second distinguishing means for distinguishing a processing kind of data from the predetermined data received from the data transmitting means;

decision means for making a decision as to whether the supported processing kind distinguished by the first distinguishing means matches the processing kind distinguished by the second distinguishing means;

converting means for converting the processing kind of the predetermined data into the supported processing kind distinguished by the first distinguishing means when the decision means has made a decision that the processing kind of the predetermined data does not match the supported processing kind;

data receiving means for receiving data obtained by the converting means; and executing means for executing the data received by the data receiving means.

7. A data conversion system implemented in a network, comprising:

data request transmitting means for transmitting a data request for obtaining predetermined data, the data request having a supported processing kind of data added thereto;

first distinguishing means for distinguishing the supported processing kind of data based on the data request transmitted by the data request transmitting means;

data storage means storing the predetermined data;

request receiving means for receiving the data request from the data request transmitting means;

data transmitting means for transmitting the predetermined data stored in the data storage means when the data request receiving means has received the data request;

second distinguishing means for distinguishing a processing kind of data from the predetermined data received from the data transmitting means;

processing module storage means storing a plurality of processing modules corresponding to a plurality of processing kinds, respectively;

decision means for making a decision as to whether the supported processing kind distinguished by the first distinguishing means matches the processing kind distinguished by the second distinguishing means;

data receiving means for receiving a processing kind distinguished by the second distinguishing means and data that has been transmitted by the data transmitting means when the decision means has made a decision that the supported processing kind matches the processing kind, and receiving the processing kind distinguished by the second distinguishing means, the data that has been transmitted by the data transmitting means, and specific information for specifying a processing module stored in the processing module storage means corresponding to the processing kind distinguished by the second distinguishing means when the decision means has made a decision that the supported processing kind does not match the processing kind;

processing module obtaining means for obtaining a processing module corresponding to the processing kind from the processing module storage means depending on the specific information when it is not possible to process the received data based on the processing kind received by the data receiving means; and executing means for executing processing of the data received by the data receiving means based on the processing kind received by the data receiving means when it is possible to process the data based on the processing kind received by the data receiving means, and executing processing of the data received by the data receiving means based on the processing module obtained by the processing module obtaining means when it is not possible to process the data received by the data receiving means based on the processing kind received by the data receiving means.

8. A data conversion system implemented in a network, comprising:

data request transmitting means for transmitting a data request for obtaining predetermined data, the data request having a supported processing kind of data added thereto;

data storage means storing data that have been converted into a plurality of different processing kinds, said data of the different processing kinds having same content;

distinguishing means for distinguishing the processing kind based on the data request transmitted by the data request transmitting means;

data transmitting means for transmitting the data stored in the data storage means corresponding to the processing kind distinguished by the distinguishing means;

data receiving means for receiving the data from the data transmitting means; and executing means for processing the data received by the data receiving means.

9. A data conversion system implemented in a network, comprising:

data request transmitting means for transmitting a data request for obtaining predetermined data, the data request having a supported processing kind of data added thereto;

first distinguishing means for distinguishing the supported processing kind of data based on the data request transmitted by the data request transmitting means;

data storage means storing the predetermined data;

request receiving means for receiving the data request from the data request transmitting means;

data transmitting means for transmitting the predetermined data stored in the data storage means when the data request receiving means has received the data request;

second distinguishing means for distinguishing a processing kind of data from the predetermined data received from the data transmitting means;

processing module storage means storing a plurality of processing modules corresponding to a plurality of processing kinds, respectively;

decision means for making a decision as to whether the supported processing kind distinguished by the first distinguishing means matches the processing kind distinguished by the second distinguishing means;

processing module obtaining means for obtaining a processing module stored in the processing module storage means corresponding to the processing kind distinguished by the second distinguishing means when the decision means has made a decision that the supported processing kind does not match the processing kind;

data receiving means for receiving a processing kind distinguished by the second distinguishing means and the data that has been transmitted by the data transmitting means when the decision means has made a decision that the supported processing kind matches the processing kind, and further receiving a processing module that has been obtained by the processing module obtaining means in addition to the processing kind distinguished by the second distinguishing means and the data transmitted by the data transmitting means when the decision means has made a decision that the supported processing kind does not match the processing kind; and executing means for processing the data received by the data receiving means based on the processing kind received by the data receiving means when it is possible to process this data based on the processing kind received by the data receiving means, and processing the data by using the processing module received by the data receiving means when it is not possible to process the data received by the data receiving means based on the processing kind received by the data receiving means.

10. A data conversion system implemented in a network, comprising;

a terminal comprising:

data request transmitting means for transmitting a data request that is expressed by a predetermined character set and a character set as an information exchange code that has been set in advance;

data receiving means for receiving data that has been requested by the data request transmitting means; and executing means for processing the data received by the data receiving means, a first device comprising:

data storage means storing the data;

request receiving means for receiving the data request from the data request transmitting means; and data transmitting means for transmitting the data stored in the data storage means when the request receiving means has received the data request, and a second device comprising:

first character set distinguishing means for distinguishing a character set based on the data request received from the data request transmitting means;

second character set distinguishing means for distinguishing a character set based on content of the data received from the data transmitting means;

deciding means for making a decision as to whether the character set distinguished by the first character set distinguishing means matches the character set distinguished by the second character set distinguishing means;

character set converting means for converting the data to be transmitted into the character set distinguished by the first character set distinguishing means when the character set distinguished by the first character set distinguishing means does not match the character set distinguished by the second character set distinguishing means; and converted-data transmitting means for transmitting to the data receiving means the data that has been converted by the character set converting means.

11. A data conversion system implemented in a network, comprising:

a terminal comprising:

data request transmitting means for transmitting a data request that is expressed by a predetermined character set, wherein the data request has a character set added thereto, the character set being an information exchange code that has been set in advance;

data receiving means for receiving the data requested by the data request transmitting means together with the character set of this data, and further receiving specific information for specifying a processing module corresponding to the data when the character set of the received data is not the character set that has been added to the data request at the time of making the request;

processing module obtaining means for obtaining a processing module corresponding to the character set depending on the specific information when the character set of the received data is not the character set that has been added to the data request at the time of making the request; and executing means for processing the received data when the character set of the received data is the character set that has been added to the data request at the time of making the request, and processing the received data by using the processing module obtained by the processing module obtaining means when the character set of the received data is not the character set that has been added to the data-obtain request at the time of making the request, a first device comprising:
  data storage means storing the data;
  request receiving means for receiving the data request from the data request transmitting means; and
  data transmitting means for transmitting the data stored in the data memory means when the request receiving means has received the data request, a second device comprising:
  first character set distinguishing means for distinguishing the character set based on the data request received from the data request transmitting means;
  second character set distinguishing means for distinguishing the character set of the data received from the data transmitting means;
  deciding means for making a decision as to whether the character set distinguished by the first character set distinguishing means matches the character set distinguished by the second character set distinguishing means; and
  data transfer means for transferring to the data receiving means the data transmitted by the data transmitting means together with the character set distinguished by the second character set distinguishing means when the deciding means has made a decision that the character set distinguished by the first character set distinguishing means matches the character set distinguished by the second character set distinguishing means, and transferring to the data receiving means the data transmitted by the data transmitting means together with the character set distinguished by the second character set distinguishing means, by further adding to them specific information that specifies a processing module corresponding to the character set distinguished by the second character set distinguishing means when the deciding means has made a decision that the character set distinguished by the first character set distinguishing means does not match the character set distinguished by the second character set distinguishing means, a third device comprising:
  processing module storage means storing a plurality of processing modules for carrying out data processing expressed by each character set corresponding to each of a plurality of character sets; and
  processing module transmitting means for extracting the processing module corresponding to the character set that has been requested by the processing module obtaining means from the processing module storage means, and transmitting the extracted processing module.

12. A data conversion system implemented in a network, comprising:

a terminal comprising:
  data request transmitting means for transmitting a data request that is expressed by a predetermined character set, wherein the data request has a character set added thereto, the character set being an information exchange code that has been set in advance;
  data receiving means for receiving data that has been requested by the data request transmitting means; and
  executing means for processing the data received by the data receiving means, and a first device comprising:
  data storage means storing data for a plurality of different character sets, said data having the same content as content of the data which is requested by the data request transmitting means;
  character set distinguishing means for distinguishing the character set based on the data request received from the data request transmitting means; and
  data transmitting means for extracting the data requested by the data request transmitting means corresponding to the character set distinguished by the character set distinguishing means from the data storage means, and transmitting the extracted data.

13. A data conversion system implemented in a network, comprising:

a terminal comprising:
  data request transmitting means for transmitting a data request that is expressed by a predetermined character set, wherein the data request has a character set added thereto, the character set being an information exchange code that has been set in advance;
  data receiving means for receiving data that has been requested by the data request transmitting means; and
  executing means for processing the data received by the data receiving means, and a first device comprising:
  data storage means storing data;
  request receiving means for receiving the data request received from the data request transmitting means;
  data reading means for reading out the data stored in the data storage means when the request receiving means has received the data request;
  first character set distinguishing means for distinguishing a character set based on the data request received from the data request transmitting means;
  second character set distinguishing means for distinguishing a character set of the data that has been read by the data reading means;
  deciding means for making a decision as to whether the character set distinguished by the first character set distinguishing means matches the character set distinguished by the second character set distinguishing means;
  character set converting means for converting the read-out data into the character set distinguished by the first character set distinguishing means when the deciding means has made a decision that the character set distinguished by the first character set distinguishing means does not match the character set distinguished by the second character set distinguishing means; and
  converted-data transmitting means for transmitting the data that has been converted by the character set converting means to the terminal.

14. A data conversion system implemented in a network, comprising:

a terminal comprising:
  data request transmitting means for transmitting a data request that is expressed by a predetermined character set, wherein the data request has a character set added thereto, the character set being an information exchange code that has been set in advance;
  data receiving means for receiving data that has been requested by the data request transmitting means together with the character set of this data, and that further receiving a processing module corresponding to the character set of the data when the character set of the received data is not the character set that has been added to the data request at the time of making the request; and executing means for processing the data received by the data receiving means when the character set of the received data is the character set that has been added to the data request at the time of making the request, and processing the received data by using the processing module received by the data receiving means when the character set of the received data is not the character set that has been added to the data request at the time of making the request;

a first device comprising:

data storage means storing the data;

request receiving means for receiving the data request received from the data request transmitting means; and data transmitting means for transmitting the data stored in the data storage means when the request receiving means has received the data request;

a second device comprising:

first character set distinguishing means for distinguishing the character set based on the data request received from the data request transmitting means;

second character set distinguishing means for distinguishing the character set of the data received from the data transmitting means;

deciding means for making a decision as to whether or not the character set distinguished by the first character set distinguishing means matches the character set distinguished by the second character set distinguishing means;

processing module obtaining means for obtaining a processing module corresponding to the character set distinguished by the second character set distinguishing means from a third device when the deciding means has made a decision that the character set distinguished by the first character set distinguishing means does not match the character set distinguished by the second character set distinguishing means; and data transfer means for transferring the data transmitted by the data transmitting means together with the character set distinguished by the second character set distinguishing means to the data receiving means when the deciding means has made a decision that the character set distinguished by the first character set distinguishing means does not match the character set distinguished by the second character set distinguishing means, and transferring the data transmitted by the data transmitting means together with the character set distinguished by the second character set distinguishing means to the data receiving means, by further adding to them the processing module obtained by the processing module obtaining means when the deciding means has made a decision that the character set distinguished by the first character set distinguishing means does not match the character set distinguished by the second character set distinguishing means, and a third device comprising:

processing module storage means storing a plurality of processing modules for carrying out a data processing expressed by each character set corresponding to each of a plurality of character sets; and processing module transmitting means for extracting the processing module corresponding to the character set that has been requested by the processing module obtaining means from the processing module storage means, and transmitting the extracted processing module.

15. In a system comprising: a server storing predetermined data; a data requesting terminal for requesting the predetermined data from the server; and a network for connecting the server and the data requesting terminal, a data converting method comprising the steps of:

at the data requesting terminal, sending a terminal-supported character code to the network when transmitting a data request to the network, wherein the terminal-supported character code is supported in the data requesting terminal;

at the network, receiving the predetermined data from the server in response to the data request received from the data requesting terminal;

determining whether a character code of the predetermined data is identical to the terminal-supported character code;

when the character code of the predetermined data is different from the terminal-supported character code, converting the character code of the predetermined data to the terminal-supported character code; and transmitting the predetermined data of the terminal-supported character code to the data requesting terminal.

16. In a system comprising: a server storing predetermined data; a data requesting terminal for requesting the predetermined data from the server; and a network for connecting the server and the data requesting terminal, a data converting method comprising the steps of:

at the network, storing a plurality of character code processing modules each corresponding to a plurality of character codes; and receiving the predetermined data from the server in response to a data request received from the data requesting terminal;

determining whether a character code of the predetermined data is identical to the terminal-supported character code;

when the character code of the predetermined data is different from the terminal-supported character code, receiving a module address of a character code processing module corresponding to the terminal-supported character code from the character code server;

sending a combination of the predetermined data and the module address to the data requesting terminal;

at the data requesting terminal, sending a terminal-supported character code to the network when transmitting the data request to the network, wherein the terminal-supported character code is supported in the data requesting terminal;

receiving a character code processing module corresponding to the terminal-supported character code from the character code server based on the module address received from the node; and converting the character code of the predetermined data to the terminal-supported character code by executing the character code processing module corresponding to the terminal-supported character code.

17. In a system comprising: a server storing predetermined data; a data requesting terminal for requesting the predetermined data from the server; and a network for connecting the server and the data requesting terminal, a data converting method comprising the steps of:

at the data requesting terminal, sending a terminal-supported character code to the network when transmitting a data request to the network, wherein the terminal-supported character code is supported in the data requesting terminal;

at the network, storing a plurality of character code processing modules each corresponding to a plurality of character codes;

receiving the predetermined data from the server in response to the data request received from the data requesting terminal;

determining whether a character code of the predetermined data is identical to the terminal-supported character code;

when the character code of the predetermined data is different from the terminal-supported character code, receiving a character code processing module corresponding to the terminal-supported character code from the character code server;

sending a combination of the predetermined data and the character code processing module to the data requesting terminal; and at the data requesting terminal, converting the character code of the predetermined data to the terminal-supported character code by executing the character code processing module received from the node.

18. In a system comprising: a server storing predetermined data; a data requesting terminal for requesting the predetermined data from the server; and a network for connecting the server and the data requesting terminal, a data converting method comprising the steps of:

at the data requesting terminal, sending a terminal-supported character code to the server when transmitting a data request to the server, wherein the terminal-supported character code is supported in the data requesting terminal;

at the server, storing the predetermined data described in a plurality of character codes; and sending the predetermined data of a character code that is the same as the terminal-supported character code to the data requesting terminal.

19. In a system comprising: a server storing predetermined data; a data requesting terminal for requesting the predetermined data from the server; and a network for connecting the server and the data requesting terminal, a data converting method comprising the steps of:

at the data requesting terminal, sending a terminal-supported character code to the server when transmitting a data request to the server, wherein the terminal-supported character code is supported in the data requesting terminal;

at the server, converting a character code of the predetermined data to the terminal-supported code when the character code of the predetermined data Is different from the terminal-supported code; and sending the predetermined data of the terminal-supported code to the data requesting terminal.

\* \* \* \* \*